United States Patent
Huang et al.

(10) Patent No.: US 12,037,459 B2
(45) Date of Patent: Jul. 16, 2024

(54) ADDITIVE ORGANOPOLYSILOXANE COMPOSITION, CURABLE COMPOSITION, AND FILM

(71) Applicant: Dow Silicones Corporation, Midland, MI (US)

(72) Inventors: Fuming Huang, Shanghai (CN); Chengrong Zhu, Shanghai (CN); Shenglan Zhang, Shanghai (CN); Zhihua Liu, Shanghai (CN)

(73) Assignee: DOW SILICONES CORPORATION

( * ) Notice: Subject to any disclaimer, the term of this patent is extended or adjusted under 35 U.S.C. 154(b) by 484 days.

(21) Appl. No.: 17/431,458

(22) PCT Filed: Sep. 27, 2020

(86) PCT No.: PCT/CN2020/118018
§ 371 (c)(1),
(2) Date: Aug. 17, 2021

(87) PCT Pub. No.: WO2022/061795
PCT Pub. Date: Mar. 31, 2022

(65) Prior Publication Data
US 2023/0192960 A1  Jun. 22, 2023

(51) Int. Cl.
| | |
|---|---|
| *C08G 77/20* | (2006.01) |
| *C08G 77/08* | (2006.01) |
| *C08G 77/00* | (2006.01) |
| *C08J 5/18* | (2006.01) |
| *C09D 183/04* | (2006.01) |
| *C08K 5/54* | (2006.01) |

(52) U.S. Cl.
CPC ............ *C08G 77/20* (2013.01); *C08G 77/08* (2013.01); *C08G 77/70* (2013.01); *C08J 5/18* (2013.01); *C08K 5/54* (2013.01); *C09D 183/04* (2013.01); *C08J 2383/07* (2013.01)

(58) Field of Classification Search
CPC ...... C08G 77/12; C08G 77/20; C08G 77/045; C08L 83/04; B01J 23/40
See application file for complete search history.

(56) References Cited

U.S. PATENT DOCUMENTS

| | | |
|---|---|---|
| 3,159,601 A | 12/1964 | Ashby |
| 3,220,972 A | 11/1965 | Lamoreaux |
| 3,296,291 A | 1/1967 | Scotia et al. |
| 3,419,593 A | 12/1968 | Willing |
| 3,516,946 A | 6/1970 | Scotia |
| 3,814,730 A | 6/1974 | Karstedt |
| 3,928,629 A | 12/1975 | Chandra et al. |
| 3,989,668 A | 11/1976 | Lee et al. |
| 4,329,273 A | 5/1982 | Hardman et al. |
| 4,370,358 A | 1/1983 | Hayes et al. |
| 4,707,531 A | 11/1987 | Shirahata |
| 5,036,117 A | 7/1991 | Chung et al. |
| 5,175,325 A | 12/1992 | Brown et al. |
| 5,310,843 A | 5/1994 | Morita |
| 5,536,803 A | 7/1996 | Fujiki et al. |
| 5,625,023 A | 4/1997 | Chung et al. |
| 5,861,457 A | 1/1999 | Weidner et al. |
| 6,489,407 B1 | 12/2002 | Clark et al. |
| 6,586,535 B1 | 7/2003 | Clark et al. |
| 6,605,734 B2 | 8/2003 | Roy et al. |
| 6,805,914 B2 | 10/2004 | Clark et al. |
| 7,378,482 B2 | 5/2008 | Asch et al. |
| 7,429,636 B2 | 9/2008 | Asch et al. |
| 8,722,153 B2 | 5/2014 | Ekeland |
| 9,562,149 B2 | 2/2017 | Cray et al. |
| 9,758,701 B2 | 9/2017 | Griswold et al. |
| 2002/0061998 A1 | 5/2002 | Cray et al. |
| 2003/0088042 A1 | 5/2003 | Griswold et al. |
| 2004/0254274 A1 | 12/2004 | Griswold |
| 2005/0038188 A1 | 2/2005 | Ahn et al. |
| 2011/0287267 A1 | 11/2011 | Hori et al. |
| 2012/0244346 A1 | 9/2012 | Moorlag et al. |
| 2012/0328863 A1 | 12/2012 | Kuo |
| 2020/0231809 A1* | 7/2020 | Bekemeier ............... C09J 7/401 |

FOREIGN PATENT DOCUMENTS

| | | |
|---|---|---|
| CN | 111032800 | 4/2020 |
| EP | 0644246 | 3/1995 |
| EP | 0860487 | 8/1998 |
| TW | 614318 | 2/2018 |
| WO | 2015058398 | 4/2015 |
| WO | 2019140197 | 7/2019 |
| WO | 2020131369 | 6/2020 |

OTHER PUBLICATIONS

Office Action Report Letter from corresponding Japanese Application No. 2021-551813 dated Dec. 21, 2022.

* cited by examiner

*Primary Examiner* — Kuo Liang Peng
(74) *Attorney, Agent, or Firm* — Catherine Brown

(57) ABSTRACT

An (A) additive organopolysiloxane composition is disclosed, which includes (A1) a branched organopolysiloxane polymer comprising M, D and Q siloxy units, (A2) a silicone resin, and (A3) a polydiorganosiloxane oligomer. A curable composition is also disclosed, the curable composition including the (A) additive organopolysiloxane composition, (B) an organosilicon compound having at least two silicon-bonded hydrogen atoms per molecule, and (C) a hydrosilylation catalyst. A method of preparing the curable composition, and a method of forming a film with the curable composition are also disclosed. The compositions and methods are useful for forming silicone release coatings with high release force.

20 Claims, No Drawings

ADDITIVE ORGANOPOLYSILOXANE COMPOSITION, CURABLE COMPOSITION, AND FILM

CROSS-REFERENCE TO RELATED APPLICATIONS

This application is a U.S. national stage filing under 35 U.S.C. § 371 of PCT Application No. PCT/CN20/118018 filed on 27 Sep. 2020, currently pending. PCT Application No. PCT/CN20/118018 is hereby incorporated by reference.

FIELD OF THE INVENTION

This invention generally relates to an additive organopolysiloxane composition and, more specifically, an additive organopolysiloxane composition and a curable composition comprising the same, which forms films having excellent release properties.

INTRODUCTION

Silicone compositions are known in the art and utilized in myriad industries and end use applications. One such end use application is to form release liners from which adhesives can be removed. For example, silicone compositions may be utilized to coat various substrates, such as paper or plastic, to give release liners for laminating pressure sensitive adhesives (e.g., tapes). Such silicone compositions are typically addition-curable.

Conventional release liners are typically formed by addition reacting an organopolysiloxane having an unsaturated hydrocarbon group and an organohydrogenpolysiloxane in the presence of a hydrosilylation reaction catalyst. However, the releasing force of conventional release liners is often undesirably low. High release additives have been proposed.

However, certain high release additives contain organic solvents, which may be undesirable to customers for several reasons. Organic solvents may evaporate out of the additive after opening the container for initial usage. This can cause undesirable odor and variance in the performance as the other ingredients in the high release additive become concentrated. Furthermore, previously proposed high release additives may still produce release coatings with insufficient release force for some application.

SUMMARY OF THE INVENTION

An (A) additive organopolysiloxane composition comprises (A1) a branched organopolysiloxane polymer having unit formula: $(R^1_{3-x}R^2_xSiO_{1/2})_a(R^1_{2-y}R^2_ySiO_{2/2})_b(SiO_{4/2})_c$, wherein each $R^1$ independently is a substituted or unsubstituted hydrocarbyl group; each $R^2$ independently is an aliphatically unsaturated group; subscript x represents number of aliphatically unsaturated groups $R^2$ in the (monofunctional) unit of formula $(R^1_{3-x}R^2_xSiO_{1/2})$ and subscript x has a value from 0 to 3; subscript y represents the number of aliphatically unsaturated groups $R^2$ in the (difunctional) unit of formula $(R^1_{2-y}R^2_ySiO_{2/2})$, and subscript y has a value from 0 to 2, with the proviso that x and y are not simultaneously 0; subscripts a, b, and c represent mole fractions of monofunctional units, difunctional units, and quadrifunctional units (of formula $(SiO_{4/2})$) in the branched organopolysiloxane polymer, and subscripts a, b, and c have values such that $0<a\leq0.3$, $0.49\leq b\leq0.97$, and $0<c\leq0.3$, with the proviso that $a+b+c=1$.

The (A) additive organopolysiloxane composition further comprises (A2) a silicone resin having comprising unit formula: $(R^1_{3-z}R^2_zSiO_{1/2})_d(SiO_{4/2})_e$, wherein each $R^1$ and $R^2$ is independently selected and defined above; subscripts d and e represent mole fractions of each unit in the formula and have values such that $0.25\leq d\leq0.7$, $0.39\leq e\leq0.8$, with the proviso that $d+e=1$; subscript z represents the number of aliphatically unsaturated groups $R^2$ in the (monofunctional) siloxane unit of formula $(R^1_{3-z}R^2_zSiO_{1/2})$, wherein z is from 0 to 3 with the proviso that the (A2) silicone resin includes a content of $R^2$ of from 1.5% to 7.0% based on total weight of the (A2) silicone resin.

The additive organopolysiloxane composition further comprises (A3) a polydiorganosiloxane having unit formula: $(R^1_2R^2SiO_{1/2})_f(R_3SiO_{1/2})_g(R^1R^2SiO_{2/2})_h(R^1_2SiO_{2/2})_i$, where subscripts f, g, h, and i represent numbers of each unit in the formula and have values such that f is 0, 1, or 2; g is 0, 1, or 2; $h\geq0$, $i\geq0$; and $4\geq f+g+h+i\geq2$.

The components in the (A) additive organopolysiloxane composition are present in amounts such that the additive organopolysiloxane composition has a content of aliphatically unsaturated groups of 1.0% to 15.0% based on combined weights of the (A1) branched organopolysiloxane polymer, the (A2) silicone resin, and the (A3) polydiorganosiloxane. The (A1) branched organopolysiloxane polymer and the (A2) silicone resin are present in the additive organopolysiloxane composition in amounts sufficient to provide a weight ratio of (A2) resin/(A1) polymer (Resin/Polymer Ratio) of 0.8/1 to 2.0/1. And, the (A3) polydiorganosiloxane is present in the additive organopolysiloxane composition in an amount of >0% to 50%, based on combined weights of components (A1), (A2), and (A3).

A curable composition comprises the (A) additive organopolysiloxane composition described above. The curable composition further comprises (B) an organosilicon compound having at least two silicon-bonded hydrogen atoms per molecule. In addition, the curable composition comprises (C) a hydrosilylation catalyst.

A method of preparing the curable composition comprises combining the (A) additive organopolysiloxane composition, the (B) organosilicon compound having at least two silicon-bonded hydrogen atoms per molecule, and the (C) hydrosilylation catalyst to give the curable composition.

A method of forming a film with the curable composition comprises applying the curable composition described above on a substrate to give a deposit. This method further comprises forming a film on the substrate from the deposit.

DETAILED DESCRIPTION

The present invention provides the (A) additive organopolysiloxane composition described above. The (A) additive organopolysiloxane composition is particularly well suited for curable compositions, e.g., those which are hydrosilylation-reaction curable. The (A) additive organopolysiloxane composition and a curable composition including the (A) additive organopolysiloxane composition have excellent physical properties and are well suited for diverse end use applications. The curable composition including the (A) additive organopolysiloxane composition forms films having desirable properties, including release properties. For example, the curable composition including the (A) additive organopolysiloxane composition forms films having excellent release properties, including high release force at low peel speeds and high subsequent adhesive strength.

The (A) additive organopolysiloxane composition comprises (A1) a branched organopolysiloxane polymer having unit formula: $(R^1_{3-x}R^2_xSiO_{1/2})_a(R^1_{2-y}R^2_ySiO_{2/2})_b(SiO_{4/2})_c$, wherein each $R^1$ independently is a substituted or unsubstituted hydrocarbyl group; each $R^2$ independently is an aliphatically unsaturated group; subscripts x represents number of aliphatically unsaturated groups $R^2$ in the monofunctional unit of formula $(R^1_{3-x}R^2_xSiO_{1/2})$ and subscript x has a value from 0 to 3; subscript y represents the number of aliphatically unsaturated groups $R^2$ in the difunctional unit of formula $(R^1_{2-y}R^2_ySiO_{2/2})$, and subscript y has a value from 0 to 2, with the proviso that x and y are not simultaneously 0; subscripts a, b, and c represent mole fractions of monofunctional, difunctional and quadrifunctional units in the branched organopolysiloxane polymer, and subscripts a, b, and c have values such that $0<a\leq 0.3$, $0.49\leq b\leq 0.97$, and $0<c\leq 0.3$, with the proviso that a+b+c=1. The (A1) branched organopolysiloxane polymer has an average of at least three $R^2$ groups per molecule.

The (A1) branched organopolysiloxane polymer generally comprises the monofunctional (M) siloxy units (i.e., the $(R^1_{3-x}R^2_xSiO_{1/2})$ siloxy units), difunctional (D) siloxy units (i.e., the $(R^1_{2-y}R^2_ySiO_{2/2})$ siloxy units), and quadrifunctional (Q) siloxy units (i.e., the $(SiO_{4/2})$ siloxy units). Although the (A1) branched organopolysiloxane δpolymer includes at least one Q siloxy unit, the (A1) branched organopolysiloxane polymer is considered a branched silicone polymer by one of skill in the art, rather than a silicone resin, due to the degree of polymerization (DP) in the (A1) branched organopolysiloxane polymer and the molar fraction of Q siloxy units present therein.

The unit formula of the (A1) branched organopolysiloxane polymer is representative of the average formula of the M, D and Q siloxy units. For example, the M siloxy units may be independently selected within the formula $(R^1_{3-x}R^2_xSiO_{1/2})$, and the D siloxy units may be independently selected within the formula $(R^1_{2-y}R^2_ySiO_{2/2})$. The subscripts, or mole fractions of the M, D and Q siloxy units in the (A1) branched organopolysiloxane polymer, are collective based on all M siloxy units, all D siloxy units, and all Q siloxy units, respectively. By way of example, the (A1) branched organopolysiloxane polymer may include M units corresponding to $(R^1_3SiO_{1/2})$, $(R^1_2R^2SiO_{1/2})$, $(R^1R^2_2SiO_{1/2})$, and/or $(R^2_3SiO_{1/2})$, depending on whether subscript x is 0, 1, 2 or 3. Similarly, the (A1) branched organopolysiloxane polymer may include D units corresponding to $(R^1_2SiO_{2/2})$, $(R^1R^2SiO_{2/2})$, and/or $(R^2_2SiO_{2/2})$, depending on whether subscript y is 0, 1 or 2. Alternatively, the M units may be selected from the group consisting of $(R^1_3SiO_{1/2})$, $(R^1_2R^2SiO_{1/2})$, and a combination thereof. Alternatively, the M units may be $(R^1_2R^2SiO_{1/2})$ in the (A1) branched organopolysiloxane polymer. Alternatively, the D units may be selected from the group consisting of $(R^1_2SiO_{2/2})$, $(R^1R^2SiO_{2/2})$, and a combination thereof in the (A1) branched organopolysiloxane polymer.

Each $R^1$ is an independently selected hydrocarbyl group, which may be substituted or unsubstituted. Each $R^1$ independently may be linear, branched, cyclic, or combinations thereof. Cyclic hydrocarbyl groups encompass aryl groups as well as saturated or non-conjugated cyclic groups. Aryl groups may be monocyclic or polycyclic. One example of a combination of a linear and cyclic hydrocarbyl group is an aralkyl group. By "substituted," it is meant that one or more hydrogen atoms may be replaced with atoms other than hydrogen (e.g., a halogen atom, such as chlorine, fluorine, or bromine), or a carbon atom within the chain of $R^1$ may be replaced with an atom other than carbon, i.e., $R^1$ may include one or more heteroatoms within the chain, such as oxygen, sulfur, nitrogen, or phosphorus. Hydrocarbyl groups may be exemplified by methyl, ethyl, propyl, isopropyl, butyl, isobutyl, t-butyl, pentyl, hexyl, cyclohexyl, heptyl, octyl, nonyl, decyl, or a similar alkyl group; phenyl, tolyl, xylyl, naphthyl, or a similar aryl group; a benzyl, phenethyl, or a similar aralkyl group; and 3-chloropropyl, 2-bromoethyl, 3,3,3-trifluoropropyl, or a similar substituted (e.g., halogenated) alkyl group. When $R^1$ is not an aryl group, each $R^1$ is typically saturated and not an alkenyl or alkynyl group. Alternatively, each $R^1$ may be an alkyl group. Alternatively, each $R^1$ may be independently selected from the group consisting of methyl, ethyl, propyl, isopropyl, butyl, isobutyl, t-butyl, pentyl, hexyl, and cyclohexyl. Alternatively, each $R^1$ may be independently selected from the group consisting of methyl, ethyl, propyl, and isopropyl. Alternatively, each $R^1$ may be methyl.

Each $R^2$ is an independently selected aliphatically unsaturated group, which may alternatively be referred to as ethylenic unsaturation. The ethylenic unsaturation in $R^2$ may be terminal. Each $R^2$ may be independently selected from the group consisting of an alkenyl group and an alkynyl group. "Alkenyl" means an acyclic, branched or unbranched, monovalent hydrocarbon group having one or more carbon-carbon double bonds. Alkenyl groups may have 2 to 30 carbon atoms, alternatively 2 to 24 carbon atoms, alternatively 2 to 20 carbon atoms, alternatively 2 to 12 carbon atoms, alternatively 2 to 10 carbon atoms, and alternatively 2 to 6 carbon atoms. Specific examples thereof include vinyl groups, allyl groups, and hexenyl groups. "Alkynyl" means an acyclic, branched or unbranched, monovalent hydrocarbon group having one or more carbon-carbon triple bonds. Alkynyl groups may have 2 to 30 carbon atoms, alternatively 2 to 24 carbon atoms, alternatively 2 to 20 carbon atoms, alternatively 2 to 12 carbon atoms, alternatively 2 to 10 carbon atoms, and alternatively 2 to 6 carbon atoms. Specific examples thereof include ethynyl, propynyl, and butynyl groups. Various examples of $R^2$ include $CH_2=CH-$, $CH_2=CHCH_2-$, $CH_2=CH(CH_2)_4-$, $CH_2=C(CH_3)CH_2-$, $H_2C=C(CH_3)-$, $H_2C=C(CH_3)-H_2C=C(CH_3)CH_2-$ $H_2C=CHCH_2CH_2-$, $H_2C=CHCH_2CH_2CH_2-$, $HC\equiv C-$, $HC\equiv CCH_2-$, $HC\equiv CCH(CH_3)-HC\equiv CC(CH_3)_2-$, and $HC\equiv CC(CH_3)_2CH_2-$. Alternatively, each $R^2$ may be an alkenyl group. Alternatively, each $R^2$ may be independently selected from the group consisting of vinyl, allyl, and hexenyl; alternatively vinyl and hexenyl. Alternatively, each $R^2$ may be a vinyl group.

The (A1) branched organopolysiloxane polymer may have one Q siloxy unit, per molecule. Alternatively, the (A1) branched organopolysiloxane polymer may have two Q siloxy units, alternatively three Q siloxy units, per molecule. The (A1) branched organopolysiloxane polymer may have a degree of polymerization (DP) of 5 to 400, alternatively from 10 to 200, alternatively from 14 to 160.

Alternatively, in the unit formula above, when $x\geq 1$ and y is 0, the aliphatically unsaturated group $R^2$ is present in M siloxy units (e.g., as vinyldimethyl siloxy units, divinylmethyl siloxy units, and/or trivinyl siloxy units) but not D siloxy units. Alternatively, when x is 0 and $y\geq 1$, then $R^2$ is present in D siloxy units (e.g., as methylvinyl siloxy groups and/or as divinyl siloxy groups), but not M siloxy units. Alternatively still, when $x\geq 1$ and $y\geq 1$, then $R^2$ is present in both the M siloxy units and D siloxy units. Alternatively, $R^2$ may be present in both the M siloxy units and the D siloxy units. Alternatively, $R^2$ may be present in the M siloxy units but not the D siloxy units.

Alternatively, when the (A1) branched organopolysiloxane polymer includes a single Q siloxy unit, the (A1) branched organopolysiloxane polymer has the following general formula:

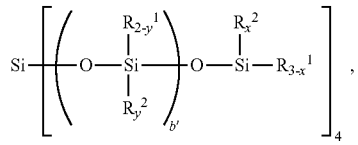

wherein each $R^1$ and $R^2$ is independently selected and defined above, x and y are defined above, and each b' independently is from 0 to 100. The description above relating to x and y and whether $R^2$ is present in the D siloxy units and/or the M siloxy units applies to this general formula as well. For example, $R^2$ may be pendant (i.e., in D siloxy units) and/or terminal (i.e., in M siloxy units). When $R^2$ is present in M siloxy units, $R^2$ is referred to as being terminal despite the (A1) branched organopolysiloxane being branched rather than being linear (i.e., not having but two terminals).

However, because the (A1) branched organopolysiloxane polymer includes D siloxy units, all instances of b' (i.e., all four instances) cannot simultaneously be 0. The DP of the (A1) branched organopolysiloxane polymer in these embodiments is based on the aggregate or collective amount of b'. The (A1) branched organopolysiloxane polymer includes at least one, alternatively at least two, alternatively at least three, alternatively four, substantially linear, alternatively linear, chains extending from the silicon atom of the Q unit. These substantially linear, alternatively linear, chains correspond to the repeating D siloxy units when any iteration of b' is greater than 0.

Alternatively, the (A1) branched organopolysiloxane polymer may include a single Q siloxy unit and no trifunctional (T) siloxy units. T siloxy units, as understood in the art, may be represented by $R^1SiO_{3/2}$ or $R^2SiO_{3/2}$, and include one silicon-bonded substituent (which may be $R^1$, $R^2$, or a substituent other than $R^1$ or $R^2$). The (A1) branched organopolysiloxane polymer includes D siloxy units, corresponding to each iteration of subscript b'. Because b' is independently selected, each linear chain of D siloxy units indicated by subscript b' may vary, i.e., each b' may be the same as or different from one another. One or more instances of b' may be 0 such that an M siloxy unit is bonded directly to the single Q siloxy unit, although typically each M siloxy unit is spaced from the Q siloxy unit by at least one D siloxy unit. The (A1) branched organopolysiloxane polymer may also be generally symmetrical, i.e., when all instances of b' are the same. Each of the linear chains of D siloxy units in the (A1) branched organopolysiloxane polymer terminates with an M siloxy unit.

Alternatively, each $R^1$ may be methyl (Me), each $R^2$ may be vinyl (Vi), y may be 0, and x may be 1 such that the (A1) branched o 1 siloxane polymer has general formula:

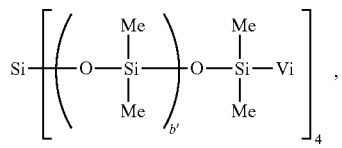

wherein b' is independently selected and defined above.

Alternatively, each $R^1$ may be methyl (Me), each $R^2$ may be vinyl (Vi), y may be 1, and x may be 1 such that the (A1) branched organopolysiloxane polymer has general formula:

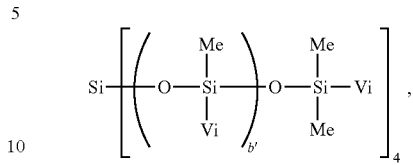

wherein b' is independently selected and defined above.

Regardless of the selection of the (A1) branched organopolysiloxane polymer, the (A1) branched organopolysiloxane polymer has at least three aliphatically unsaturated groups designated by $R^2$, per molecule. Alternatively, the (A1) branched organopolysiloxane polymer may have a content of (A1) branched organopolysiloxane polymer has a content of $R^2$ of from 2.0% to 7.0%, alternatively from 2.0% to 6.0%, alternatively from 2.0% to 5.5%, based on total weight of the (A1) branched organopolysiloxane polymer. This is typically the case when each $R^2$ is vinyl and each $R^1$ is methyl. However, as understood in the art, the same number of $R^2$ groups may constitute a lesser overall weight percentage of $R^2$ when $R^1$ is something other than methyl (e.g., ethyl, and/or aryl) and/or when $R^2$ is something other than vinyl (e.g., allyl and/or hexenyl), which impact the molecular weight of the (A1) branched organopolysiloxane polymer. The content of $R^2$ can be interpreted and calculated using Silicon 29 Nuclear Magnetic Resonance Spectroscopy ($^{29}$Si NMR), as understood in the art.

The (A1) branched organopolysiloxane polymer may have a viscosity at 25° C. from greater than 0 mm$^2$/s to less than 1000 mm$^2$/s, alternatively from greater than 0 mm$^2$/s to less than 500 mm$^2$/s, alternatively from greater than 0 mm$^2$/s to less than 300 mm$^2$/s. Alternatively, the (A1) branched organopolysiloxane polymer may have a weight-average molecular weight molecular weight (MW) of from greater than 0 to 30,000 g/mol, alternatively from 1,000 g/mol to 20,000 g/mol, alternatively from 1,500 g/mol to 15,000 g/mol. The viscosity of the (A1) branched organopolysiloxane polymer can be measured by BROOKFIELD DV2T viscometer. MW of the (A1) branched organopolysiloxane polymer can be determined via gel permeation chromatography employing a light-scattering detector, a refractive index detector, and a viscosity detector while employing polystyrene standards.

Component (A1) may be one branched organopolysiloxane polymer. Alternatively, component (A1) may be a combination of two or more different branched organopolysiloxane polymers. Methods of preparing (A1) branched organopolysiloxane polymers are known in the art, for example, as described in U.S. Patent Application Publication 2002/0061998 to Cray, et al.

The (A) additive organopolysiloxane composition further comprises (A2) a silicone resin. The silicone resin comprises unit formula: $(R^1_{3-z}R^2_zSiO_{1/2})_d(SiO_{4/2})_e$, wherein each $R^1$ and $R^2$ is independently selected and defined above; subscripts d and e represent mole fractions of each unit in the formula and have values such that $0.2 \leq d \leq 0.7$, $0.3 \leq e \leq 0.8$, with the proviso that $(d+e)=1$; and subscript z represents number of aliphatically unsaturated groups $R^2$ in the unit of formula $(R^1_{3-z}R^2_zSiO_{1/2})$, and z has a value from 0 to 3. However, as described below, the (A2) silicone resin includes at least some content of $R^2$ indicated by z.

The (A2) silicone resin is an MQ silicone resin. The subscript, or mole fraction of the M siloxy units in the (A2) silicone resin, are collective based on all M siloxy units. By way of example, the (A2) silicone resin may include M units corresponding to $(R^1_3SiO_{1/2})$, $(R^1_2R^2SiO_{1/2})$, $(R^1R^2_2SiO_{1/2})$, and/or $(R^2_3SiO_{1/2})$, depending on whether subscript z is 0, 1, 2 or 3. As a further example, the unit formula of the (A2) silicone resin may alternatively comprise: $(R^1_3SiO_{1/2})_{d'}(R^1_2R^2SiO_{1/2})_{d''}(R^1R^2_2SiO_{1/2})_{d'''}(R^2_3SiO_{1/2})_{d''''}(SiO_{4/2})_e$, wherein the collective sum of d' to d'''' is equivalent to d in the general formula for the silicone resin first introduced above (i.e., d'+d''+d'''+d''''=d).

Alternatively, subscripts d and e may be selected such that a mole ratio of d to e in the (A2) silicone resin is from 0.6:1 to 1.1:1. As known in the art, MQ resins typically include at least some residual hydroxyl content [in the form of silanol groups $(HO_{1/2})$] For example, in certain embodiments, the (A2) silicone resin may further comprise a content of silanol groups of >0 to 3.5%, alternatively >0 to 2.0%. The content of silanol groups is generally based on solids and also can be interpreted and calculated using Silicon 29 Nuclear Magnetic Resonance Spectroscopy ($^{29}$Si NMR).

The (A2) silicone resin includes a content of $R^2$ of from 1.5% to 7.0%, alternatively from 2.0% to 7.0%, alternatively from 2.0% to 6.0%, alternatively from 2.5% to 6.0%, alternatively from 3.6% to 6.0%, alternatively from 4.0% to 5.5%, based on total weight of the (A2) silicone resin. This is typically the case when each $R^2$ is vinyl and each $R^1$ is methyl. However, as with the (A1) branched organopolysiloxane polymer, the same number of $R^2$ groups may constitute a lesser overall weight percentage of $R^2$ when $R^1$ is something other than methyl (e.g., ethyl, aryl) and/or when $R^2$ is something other than vinyl (e.g., allyl, hexenyl), which impact the molecular weight of the (A2) silicone resin. The content of $R^2$ in the (A2) silicone resin can be interpreted and calculated using Silicon 29 Nuclear Magnetic Resonance Spectroscopy ($^{29}$Si NMR), as understood in the art. Alternatively, the content of $R^2$ in the (A2) silicone resin can be interpreted and calculated using Carbon 13 Nuclear Magnetic Resonance Spectroscopy ($^{13}$C NMR), Hydrogen 1 Nuclear Magnetic Resonance Spectroscopy ($^1$H NMR), Fourier Transform Infrared Spectroscopy (FTIR), or titration, as understood in the art.

Methods of preparing MQ resins are known in the art. The (A2) silicone resin may be one MQ resin. Alternatively, the (A2) silicone resin may comprise a combination of different MQ resins together. In certain embodiments, when the (A2) silicone resin comprises a combination of different MQ resins together, the average of each of the MQ resins is within the general formula of the (A2) silicone resin.

The (A2) silicone resin may have a weight-average molecular weight (MW) of from 1,000 to 50,000, alternatively from 2,000 to 30,000, alternatively from 3,000 to 25,000, Daltons. As understood in the art, MW of the (A2) silicone resin can be determined via gel permeation chromatography employing a light-scattering detector, a refractive index detector, and a viscosity detector while employing polystyrene standards.

The (A2) silicone resin may be prepared in an organic solvent, which acts as a carrier for the (A2) silicone resin. Suitable organic solvents include aliphatic hydrocarbons, aromatic hydrocarbons, other hydrocarbons, and combinations thereof. Examples of the aliphatic hydrocarbons include heptane, tetradecane, and combinations thereof. Examples of the aromatic hydrocarbons include benzene, toluene, xylene, and combinations thereof. Other hydrocarbons include 1-tetradecene. However, the organic solvent described above is typically removed after the (A2) silicone resin is combined with the (A1) branched organopolysiloxane polymer and/or (A3) the polydiorganosiloxane, described below. The solvent may be removed by any convenient means such as stripping optionally with reduced pressure. Without wishing to be bound by theory, it is thought that the removal of the organic solvent (to a level <1,000 ppm, alternatively to a non-detectable level) will provide a benefit to the (A) additive organopolysiloxane composition in that said composition will be more consistent and have less odor when a container of the (A) additive organopolysiloxane is opened and a portion of the (A) additive organopolysiloxane composition is used as compared to previous additives that contain an organic solvent, which can evaporate out of the additive causing undesirable odor and inconsistent performance due to concentration of the remaining components. Please comment on whether the benefits are described accurately.

The (A) additive organopolysiloxane composition comprises amounts of the (A1) branched organopolysiloxane polymer (polymer) and the (A2) silicone resin (resin) such that a weight ratio of (A2)/(A1) (resin/polymer ratio) is at least 0.8/1, alternatively at least 0.9/1. At the same time, the resin/polymer ratio may be up to 2.0/1, alternatively up to 1.9/1, alternatively up to 1.8/1, alternatively up to 1.7/1, and alternatively up to 1/6/1. Alternatively resin/polymer ratio may range from 0.8/1 to 2.0/1, alternatively 0.8/1 to 1.6/1.

The (A) additive organopolysiloxane composition further comprises a (A3) polydiorganosiloxane having unit formula: $(R^1_2R^2SiO_{1/2})(R^1_3SiO_{1/2})_g(R^1R^2SiO_{2/2})_h(R^1_2SiO_{2/2})_i$, wherein $R^1$ and $R^2$ are as described above, and subscripts f, g, h, and i represent numbers of each unit in the formula and have values such that f≥0, g≥0, h≥0, i≥0, and 4≥f+g+h+i≥2.

Alternatively, in the unit formula for the (A3) the polydiorganosiloxane, each $R^1$ may be an alkyl group, such as methyl. Alternatively, in the unit formula for the (A3) polydiorganosiloxane, each $R^2$ may be an alkenyl group, such as vinyl.

Alternatively, when subscript h=4, the (A3) polydiorganosiloxane may be cyclic and have unit formula $(R^1R^2SiO_{2/2})_4$. Examples of such cyclic polydiorganosiloxanes include 1,3,5,7-tetramethyl-1,3,5,7-tetravinylcyclotetrasiloxane; 1,3,5,7-tetramethyl-1,3,5,7-tetrahexenylcyclotetrasiloxane; and a combination thereof. Suitable cyclic polydiorganosiloxanes are known in the art and are commercially available from, e.g., Sigma-Aldrich of St. Louis, Mo., USA; Milliken of Spartanburg, S.C., USA; and other vendors.

Alternatively, in the unit formula for the (A3) polydiorganosiloxane, when subscript f=2, the (A3) polydiorganosiloxane may be a linear aliphatically unsaturated polydiorganosiloxane oligomer of formula: $R^1_2R^2Si$—O—$(R^1_2Si$—$O)_i$—$SiR^1_2R^2$, wherein $R^1$, $R^2$, and subscript i are as described above. Alternatively, in this formula subscript i may be 0 or 1, alternatively 0. Examples of linear aliphatically unsaturated polydiorganosiloxane oligomers may include 1,3-divinyl-1,1,3,3-tetramethyldisiloxane; 1,5-divinyl-1,1,3,3,5,5-hexamethyl-trisiloxane; and combinations thereof. Such linear aliphatically unsaturated polydiorganosiloxane oligomers are commercially available, e.g., from Gelest, Inc. of Morrisville, Pa., USA or Sigma-Aldrich of St. Louis, Mo., USA.

Alternatively, in the unit formula for the (A3) polydiorganosiloxane, when subscript g=2, the (A3) polydiorganosiloxane may be a linear polydiorganosiloxane oligomer of formula:

$R^1_3Si-O-(R^1_2Si-O)_i-SiR^1_3$, where $R^1$ and subscript i are as described above. Alternatively, in this formula subscript i may be 0 or 1, alternatively 1. Examples of linear polydiorganosiloxane oligomers may include 1,1,1,3,3,3-hexamethyldisiloxane; 1,1,1,3,3,5,5,5-octamethyl-trisiloxane, which are commercially available, e.g., from Gelest, Inc. of Morrisville, Pa., USA or Sigma-Aldrich of St. Louis, Mo., USA.

Without wishing to be bound by theory, it is thought that the (A3) polydiorganosiloxane may reduce viscosity of the (A) additive organopolysiloxane composition at relatively low levels, e.g., >0% to 50% of the (A3) polydiorganosiloxane, based on combined weights of the (A1) polymer, the (A2) resin, and the (A3) polydiorganosiloxane, and that this will permit more resin to be incorporated into the (A) additive organopolysiloxane composition, while maintaining viscosity thereof, than is possible without the (A3) polydiorganosiloxane. Alternatively, the (A) additive organopolysiloxane composition may comprise at least 5%, alternatively at least 6%, alternatively at least 7%, alternatively at least 8%, alternatively at least 9%, alternatively at least 10% of the (A3) polydiorganosiloxane based on combined weights of components (A1), (A2), and (A3). At the same time, the (A) additive organopolysiloxane composition may comprise up to 50%, alternatively up to 45%, alternatively up to 40%, alternatively up to 35%, alternatively up to 30%, alternatively up to 25%, alternatively up to 20%, alternatively up to 15%, and alternatively up to 10% of the (A3) polydiorganosiloxane, on the same basis.

Alternatively, the (A) additive organopolysiloxane composition may comprise the (A1) branched organopolysiloxane polymer in an amount of from 20% to 60% based on combined weights of components (A1), (A2), and (A3). Alternatively, the (A) additive organopolysiloxane composition may comprise the (A2) silicone resin in an amount of from 30% to 70% based on combined weights of components (A1), (A2), and (A3). Alternatively, the (A) additive organopolysiloxane composition may comprise the (A3) polydiorganosiloxane in an amount of from >0% to 50% based on combined weights of components (A1), (A2), and (A3), as described above.

Alternatively, the (A) additive organopolysiloxane composition may consist essentially of the (A1) branched organopolysiloxane, the (A2) silicone resin, and the (A3) polydiorganosiloxane. The (A) additive organopolysiloxane composition may be free from any components which react or are reactive with the (A1) branched organopolysiloxane, the (A2) silicone resin, and the (A3) polydiorganosiloxane. The (A) additive organopolysiloxane composition may be free from any organic solvents such as the hydrocarbons described above. Alternatively, the (A) additive organopolysiloxane may consist of the (A1) branched organopolysiloxane, the (A2) silicone resin, and the (A3) polydiorganosiloxane.

The (A) additive organopolysiloxane composition may be formed in any manner. For example, the (A1) branched organopolysiloxane polymer, the (A2) silicone resin, and the (A3) polydiorganosiloxane may be separately prepared and combined in any manner, optionally with mixing and/or heating and/or in the presence of a solvent. However, the (A) additive organopolysiloxane composition is typically solventless, i.e., any solvent introduced with one or more of the components (A1), (A2), and (A3) is removed by any manner, such as stripping optionally with reduced pressure, to remove solvent to non-detectable level or to a level <1,000 ppm based on combined weights of the components (A1), (A2), and (A3).

The (A) additive organopolysiloxane composition typically has an overall content of unsaturated groups (i.e., aliphatically unsaturated groups) of greater than or equal to 1.0%, alternatively greater than 1.5%, based on combined weights of components (A1), (A2), and (A3). At the same time, the additive organopolysiloxane composition may have an overall content of aliphatically unsaturated groups of up to 15%, alternatively up to 12.5%, alternatively up to 10%, alternatively up to 7.5%, and alternatively up to 5%. For example, the (A) additive organopolysiloxane composition may have an overall content of unsaturated groups of from 1.0% to 15.0%, alternatively from 1.5% to 7.0%, on the same basis. As noted above relative to the components of the (A) additive organopolysiloxane composition, the % of unsaturated groups may be influenced by selection of substituents, including unsaturated groups, in the components of the (A) additive organopolysiloxane composition. These ranges typically apply when $R^1$ is methyl and $R^2$ is vinyl. Please confirm these ranges from 81656 still apply to the present invention including (A3).

This invention also provides a curable composition. The curable composition comprises the (A) additive organopolysiloxane composition described above. The curable composition further comprises (B) an organosilicon compound and (C) a hydrosilylation reaction catalyst.

The curable composition typically comprises the (A) additive organopolysiloxane composition in an amount of from 1% to 99%, alternatively from 5% to 60%, alternatively from 5% to 40%, based on total weight of the curable composition. As understood in the art, the presence or absence of various optional components may influence the content of the (A) additive organopolysiloxane composition.

The (B) organosilicon compound includes at least two silicon-bonded hydrogen atoms per molecule. The (B) organosilicon compound may alternatively be referred to as a crosslinker or a crosslinking agent, as it is reactive with and cross-links the aliphatically unsaturated components of the (A) additive organopolysiloxane composition.

The (B) organosilicon compound is typically an organohydrogenpolysiloxane. However, the (B) organosilicon compound may be an organic compound having silicon-hydrogen bonds while being free from siloxane (Si—O—Si) bonds, or a silicone-organic hybrid (e.g., including both siloxane and organic moieties).

For example, the (B) organosilicon compound may be of formula: $H_mR^1_{3-m}Si-R'-SiR^1_{3-m'}H_{m'}$, wherein each $R^1$ is independently selected and defined above, subscripts m and m' are independently 0, 1, or 2, with the proviso that m+m'≥2, and R is a divalent hydrocarbon group. Typically, the divalent hydrocarbon group is free of aliphatic unsaturation. The divalent hydrocarbon group may be linear, cyclic, branched, aromatic, etc., or may have combinations of such structures. Alternatively, the silicon-bonded hydrogen atoms may also or alternatively be pendant when the (B) organosilicon compound is the organic compound or the silicone-organic hybrid.

When the (B) organosilicon compound comprises the organohydrogenpolysiloxane, the (B) organosilicon compound may be any organohydrogenpolysiloxane having at least two silicon-bonded hydrogen atoms per molecule. The silicon-bonded hydrogen atoms may be terminal, pendant, or in both terminal and pendant locations in the (B) organosilicon compound in such embodiments.

The (B) organosilicon compound may comprise any combination of M, D, T and/or Q siloxy units, so long as the (B) organosilicon compound includes at least two silicon-bonded hydrogen atoms. These siloxy units can be combined in various manners to form cyclic, linear, branched and/or resinous (three-dimensional networked) structures. The (B) organosilicon compound may be monomeric, polymeric, oligomeric, linear, branched, cyclic, and/or resinous depending on the selection of M, D, T, and/or Q units.

Because the (B) organosilicon compound includes an average of at least two silicon-bonded hydrogen atoms per molecule, with reference to the siloxy units set forth above, the (B) organosilicon compound may comprise any of the following siloxy units including silicon-bonded hydrogen atoms, optionally in combination with siloxy units which do not include any silicon-bonded hydrogen atoms: $(R^1{}_2HSiO_{1/2})$, $(R^1H_2SiO_{1/2})$, $(H_3SiO_{1/2})$, $(R^1HSiO_{2/2})$, $(H_2SiO_{2/2})$, and/or $(HSiO_{3/2})$, where $R^1$ is independently selected and defined above.

Alternatively, the (B) organosilicon compound may have average unit formula: $(R^0{}_3SiO_{1/2})_p(R^0{}_2SiO_{2/2})_q$, wherein each $R^0$ is independently hydrogen or $R^1$, $p \leq 2$, and $q \geq 1$, so long as at least two of $R^0$ are hydrogen atoms. Alternatively, p may be from 2 to 10, alternatively from 2 to 8, alternatively from 2 to 6. Alternatively, q may be from 0 to 1,000, alternatively from 1 to 500, alternatively from 1 to 200.

Alternatively, the (B) organosilicon compound may be linear and may include pendant silicon-bonded hydrogen atoms. For example, the (B) organosilicon compound may be a dimethyl, methyl-hydrogen polysiloxane having unit formula: $(CH_3)_3SiO[(CH_3)_2SiO]_f[(CH_3)HSiO]_gSi(CH_3)_3$, wherein f is from 0 to 1,000, and g is from 2 to 1,000. As understood in the art, the average formula above is exemplary and can be modified to include hydrocarbyl groups other than methyl, and to include T siloxy and/or Q siloxy units. Alternatively, at least 20 mole % of all D siloxy units in this (B) organosilicon compound may be indicated by subscript g. Alternatively, a quantity f+g may be from 10 to 500. Alternatively, each of f and g may be independently from 5 to 100.

Alternatively, the (B) organosilicon compound may be linear and may include terminal silicon-bonded hydrogen atoms. For example, the (B) organosilicon compound may be an SiH terminal dimethyl polysiloxane having average formula: $H(CH_3)_2SiO[(CH_3)_2SiO]_fSi(CH_3)_2H$, wherein f is as defined above. As understood in the art, the average formula above is exemplary only and can be modified to include hydrocarbyl groups other than methyl.

Alternatively still, the (B) organosilicon compound may be linear and include both pendant and terminal silicon-bonded hydrogen atoms. Methods of preparing linear and branched polyorganohydrogensiloxanes suitable for use as component (B), such as hydrolysis and condensation of organohalosilanes, are well known in the art, as exemplified in U.S. Pat. Nos. 5,310,843; 4,370,358; 4,707,531; and 4,329,273. Polyorganohydrogensiloxanes are also commercially available, such as those available from Gelest under the tradenames: HMS-301, DMS-HM15, DMS-H03, DMS-H25, DMS-H31, and DMS-H41.

Other examples of suitable organosilicon compounds for component (B) are those having at least two SiH containing cyclosiloxane rings in one molecule. Such an organosilicon compound may be any organopolysiloxane having at least two cyclosiloxane rings with at least one silicon-bonded hydrogen (SiH) atom on each siloxane ring. Cyclosiloxane rings contain at least three siloxy units (that is the minimum needed in order to form a siloxane ring), and may be any combination of M, D, T, and/or Q siloxy units that forms a cyclic structure, provided that at least one of the cyclic siloxy units on each siloxane ring contains one SiH unit, which may be an M siloxy unit, a D siloxy unit, and/or a T siloxy unit. These siloxy units can be represented as MH, DH, and TH siloxy units respectively when other substituents are methyl. Examples of such organosilicon compounds may be made by known methods, such as those disclosed in U.S. Pat. No. 5,536,803 to Fujiki, et al.; U.S. Pat. No. 7,378,482 to Asch, et al.; U.S. Pat. No. 7,429,636 to Asch, et al. and PCT Publication WO2020/131369 to Joffre, et al.

The (B) organosilicon compound may comprise a combination or two or more different organosilicon compound in combination. The amount of the (B) organosilicon compound in the curable composition is typically selected to provide a molar ratio of silicon-bonded hydrogen atoms to silicon-bonded unsaturated groups (i.e., those represented by $R^2$) of from 0.5:1 to 4:1, alternatively from 1:1 to 3:1, alternatively from 1.5:1 to 2.5:1. This molar ratio is relative to silicon-bonded hydrogen atoms and silicon-bonded unsaturated groups present in the curable composition.

The (C) hydrosilylation catalyst can be any known hydrosilylation catalyst. As known in the art, hydrosilylation catalysts typically comprise a platinum group metal or a compound containing a platinum group metal. However, alternative hydrosilylation catalysts which are based on metals other than platinum group metals (e.g., those based on iron, nickel, and/or cobalt) may also be utilized.

By platinum group metal it is meant ruthenium, rhodium, palladium, osmium, iridium and platinum as well as any compounds and/or complexes thereof. Typically, the platinum group metal is platinum, based on its high activity in hydrosilylation reactions. Platinum group metal-containing catalysts useful for the hydrosilylation catalyst include the platinum complexes prepared as described by U.S. Pat. No. 3,419,593 to Willing, and U.S. Pat. No. 5,175,325 to Brown, et al., each of which is hereby incorporated by reference to show such complexes and their preparation. Other examples of useful platinum group metal-containing catalysts can be found in U.S. Pat. No. 2,823,218 to Speier; U.S. Pat. No. 3,989,668, to Lee et al.; U.S. Pat. No. 5,036,117 to Chung, et al.; U.S. Pat. No. 3,159,601 to Ashby; U.S. Pat. No. 3,220,972 to Lamoreaux; U.S. Pat. No. 3,296,291 to Chalk, et al.; U.S. Pat. No. 3,516,946 to Modic; U.S. Pat. No. 3,814,730 to Karstedt; and U.S. Pat. No. 3,928,629 to Chandra, et al. all of which are hereby incorporated by reference to disclose platinum group metal-containing catalysts and methods for their preparation. The platinum group-containing catalyst can be platinum group metal can be a compound or complex of a platinum group metal. Specific examples of platinum-containing catalysts include chloroplatinic acid, either in hexahydrate form or anhydrous form, and or a platinum-containing catalyst which is obtained by a method comprising reacting chloroplatinic acid with an aliphatically unsaturated organosilicon compound such as divinyltetramethyldisiloxane, or alkene-platinum-silyl complexes as described in U.S. Pat. No. 6,605,734 to Roy, which is also incorporated by reference. These alkene-platinum-silyl complexes may be prepared, for example by mixing 0.015 mole $(COD)PtCl_2$ with 0.045 mole COD and 0.0612 moles $HMeSiCl_2$, where COD represents cyclooctadiene and Me represents methyl.

Alternatively, the (C) hydrosilylation catalyst may be a supported hydrosilylation catalyst comprising a solid support having a platinum group metal on the surface thereof.

Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

The (C) hydrosilylation catalyst may also or alternatively be a photoactivatable hydrosilylation catalyst, which may initiate curing via irradiation and/or heat. The photoactivatable hydrosilylation catalyst can be any hydrosilylation catalyst capable of catalyzing a hydrosilylation reaction, particularly upon exposure to radiation having a wavelength of from 150 to 800 nanometers (nm). The suitability of particular photoactivatable hydrosilylation catalysts for use in the composition of the present invention can be readily determined by routine experimentation.

Specific examples of photoactivatable hydrosilylation catalysts suitable for purposes of the (C) hydrosilylation catalyst include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as $Pt[C_6H_5NNNOCH_3]_4$, $Pt[p-CN—C_6H_4NNNOC_6H_{11}]_4$. $Pt[p-H_3COC_6H_4NNNOC_6H_{11}]_4$. $Pt[p-CH_3(CH_2)_x—C_6H_4NNNOCH_3]_4$, 1,5-cyclooctadiene.$Pt[p-CN—C_6H_4NNNOC_6H_{11}]_2$, 1,5-cyclooctadiene.$Pt[p-CH_3O—C_6H_4NNNOCH_3]_2$, $[(C_6H_5)_3P]_3Rh[p-CN—C_6H_4NNNOC_6H_1]$, and $Pd[p-CH_3(CH_2)_x—C_6H_4NNNOCH_3]_2$, where x is 1, 3, 5, 11, or 17; (η-diolefin)(α-aryl)platinum complexes, such as (η$^4$-1,5-cyclooctadienyl)diphenylplatinum, (η$^4$-1,3,5,7-cyclooctatetraenyl)diphenylplatinum, (η$^4$-2,5-norboradienyl)diphenylplatinum, (η$^4$-1,5-cyclooctadienyl)bis-(4-dimethylaminophenyl)platinum, (η$^4$-1,5-cyclooctadienyl)bis-(4-acetylphenyl)platinum, and (η$^4$-1,5-cyclooctadienyl)bis-(4-trifluormethylphenyl)platinum. Typically, the photoactivatable hydrosilylation catalyst is a Pt(II) β-diketonate complex and more typically is platinum (II) bis(2,4-pentanedioate).

The (C) hydrosilylation catalyst can be a single hydrosilylation catalyst or a mixture comprising two or more different hydrosilylation catalysts. The (C) hydrosilylation catalyst is typically present in the curable composition in a catalytic amount, which can be readily determined. Alternatively, the (C) hydrosilylation catalyst may be present in the curable composition in an amount to provide from 1 to 1000, alternatively form 1 to 500, alternatively from 1 to 300, parts per million (ppm) metal, e.g., platinum group metal.

The curable composition may optionally further comprise one or more additional components. The additional components may be selected from the group consisting of (D) an organopolysiloxane having at least two silicon-bonded aliphatically unsaturated groups per molecule, (E) a hydrosilylation-reaction inhibitor, (F) an anchorage additive, (G) an anti-mist additive, (H) a solvent; and any combination of two or more of (D)-(H).

The (D) organopolysiloxane having at least two silicon-bonded aliphatically unsaturated groups per molecule may be distinguished from the (A1) branched organopolysiloxane polymer, the (A2) silicone resin, and the (A3) polydiorganosiloxane of the (A) additive organopolysiloxane composition. Alternatively, the (D) organopolysiloxane may be any of those described above with respect to the (A1) branched organopolysiloxane polymer, so long as the (D) organopolysiloxane is different from the (A1) branched organopolysiloxane polymer selected for use in the (A) additive organopolysiloxane composition. Alternatively, the (D) organopolysiloxane can be linear, unlike the (A1) branched organopolysiloxane polymer. Furthermore, the (D) organopolysiloxane may be distinguished from the (A3) polydiorganosiloxane in that the (D) organopolysiloxane typically has a higher degree of polymerization than the (A3) polydiorganosiloxane used in the (A) additive organopolysiloxane composition.

In the (D) organopolysiloxane, the silicon-bonded aliphatically unsaturated groups may be terminal, pendant, or in both terminal and pendant locations in the (D) organopolysiloxane in such embodiments. The (D) organopolysiloxane may comprise any combination of M, D, T and/or Q siloxy units, so long as the (D) organopolysiloxane includes at least two silicon-bonded aliphatically unsaturated groups. These siloxy units can be combined in various manners to form cyclic, linear, branched and/or resinous (three-dimensional networked) structures. The (D) organopolysiloxane may be monomeric, polymeric, oligomeric, linear, branched, cyclic, and/or resinous depending on the selection of M, D, T, and/or Q units.

Because the (D) organopolysiloxane includes an average of at least two silicon-bonded aliphatically unsaturated groups per molecule, with reference to the siloxy units set forth above, the (D) organopolysiloxane may comprise any of the following siloxy units including silicon-bonded aliphatically unsaturated groups $R^2$, optionally in combination with siloxy units which do not include any silicon-bonded aliphatically unsaturated groups: $(R^1{}_2R^2SiO_{1/2})$, $(R^1R^2{}_2SiO_{1/2})$, $(R^2{}_3SiO_{1/2})$, $(R^1R^2SiO_{2/2})$, $(R^2{}_2SiO_{2/2})$, and/or $(R^2SiO_{3/2})$, where $R^1$ and $R^2$ are each independently selected and defined above.

Alternatively, the (D) organopolysiloxane may have unit formula: $(R^1{}_{3-x'}R^2{}_{x'}SiO_{1/2})_{p'} (R^1{}_{2-y'} R^2{}_{y'}SiO_{2/2})_{q'}$, wherein each $R^1$ and $R^2$ is independently selected and defined above, x' is 0, 1, 2 or 3, y' is 0, 1, or 2, with the proviso that x'+y'≥2, p'≥2, and q'≥1. Alternatively, p' may be from 2 to 10, alternatively from 2 to 8, alternatively from 2 to 6. Alternatively, q' may be from 0 to 1,000, alternatively from 1 to 500, alternatively from 1 to 200.

Alternatively, the (D) organopolysiloxane may be linear and may include pendant silicon-bonded aliphatically unsaturated groups. For example, the (D) organopolysiloxane may be a dimethyl, methylvinyl polysiloxane having average unit formula: $(CH_3)_3SiO[(CH_3)_2SiO]_f[(CH_3)ViSiO]_gSi(CH_3)_3$ where f is ≥0 and g' is ≥2, with f'+g' ranging from 1 to 10,000, alternatively from 2 to 5,000, and Vi indicates vinyl. As understood in the art, the average unit formula above is exemplary only and can be modified to include hydrocarbyl groups other than methyl, aliphatically unsaturated groups other than vinyl, and to include T siloxy and/or Q siloxy units.

Alternatively, the (D) organopolysiloxane may be linear and may include terminal silicon-bonded aliphatically unsaturated groups. For example, the (D) organopolysiloxane may be a dimethylvinyl terminated dimethyl polysiloxane having average formula: $Vi(CH_3)_2SiO[(CH_3)_2SiO]_{f''}Si(CH_3)_2Vi$, wherein f" is from 1 to 10,000. As understood in the art, the average formula above is exemplary only and can be modified to include hydrocarbyl groups other than methyl and aliphatically unsaturated groups other than vinyl.

Alternatively still, the (D) organopolysiloxane may include both pendant and terminal silicon-bonded aliphatically unsaturated groups. In these embodiments, the (D) organopolysiloxane may be a dimethylvinyl terminated dimethyl, methylvinyl polysiloxane having average unit formula: $Vi(CH_3)_2SiO[(CH_3)_2SiO]_f[(CH_3)ViSiO]_{g'}Si(CH_3)_2Vi$, wherein f, g', and Vi are defined above. As understood in the art, the average formula above is exemplary only and can be modified to include hydrocarbyl groups other than methyl and aliphatically unsaturated groups other than vinyl.

The (D) organopolysiloxane is optional because the (A) additive organopolysiloxane includes silicon-bonded aliphatically unsaturated groups which are reactive with the silicon-bonded hydrogen atoms of the (B) organosilicon compound. When utilized, the curable composition typically comprises the (D) organopolysiloxane in an amount of from 1% to 90%, alternatively from 10% to 90%, alternatively from 40% to 90%, based on total weight of the curable composition. As understood in the art, the presence or absence of various optional components may influence the content of the (D) organopolysiloxane in the curable composition, as does the relative amount and aliphatically unsaturated group content of the (A) additive organopolysiloxane composition therein.

The curable composition may further comprise (E) a hydrosilylation-reaction inhibitor. The (E) hydrosilylation-reaction inhibitor serves to improve shelf life and stability of the curable composition at ambient conditions and generally prevents premature reaction between the components of the (A) additive organopolysiloxane composition and the (B) organosilicon compound in the presence of the (C) hydrosilylation-reaction catalyst, and, when present, the (D) organopolysiloxane and the (B) organosilicon compound in the presence of the (C) hydrosilylation-reaction catalyst. When the curable composition includes the (D) organopolysiloxane, the curable composition generally comprises the (E) hydrosilylation-reaction inhibitor.

The (E) hydrosilylation-reaction inhibitor may be exemplified by alkyne alcohols (or acetylenic alcohols), ketones, ene-yne compounds, triazoles, phosphines, mercaptans, hydrazines, sulphoxides, phosphates, nitriles, hydroperoxides, amines, ethylenically unsaturated isocyanates, fumarates (e.g., dialkyl fumarates, dialkenyl fumarates, and/or dialkoxyalkyl fumarates), maleates (e.g., diallyl maleates), alkenes, and combinations thereof.

Suitable ene-yne compounds include 3-methyl-3-penten-1-yne, 3,5-dimethyl-3-hexen-1-yne. Suitable triazoles include benzotriazole. Suitable amines include tetramethyl ethylenediamine. Examples of acetylenic alcohol inhibitors include 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol. Such inhibitors are known in the art and are commercially available. For example, acetylenic alcohols are disclosed, for example, in U.S. Pat. No. 3,445,420.

Alternatively, the (E) hydrosilylation-reaction inhibitor in the curable composition may be a silylated acetylenic inhibitor. The silylated acetylenic compound useful as ingredient (I) may be prepared by methods known in the art, such as silylating an acetylenic alcohol described above by reacting it with a chlorosilane in the presence of an acid receptor, as described, for example, in U.S. Pat. No. 6,677,407. Silylated acetylenic inhibitors are exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the (E) hydrosilylation-reaction inhibitor is exemplified by methyl(tris(1,1-dimethyl-2-propynyloxy))silane, ((1,1-dimethyl-2-propynyl)oxy)trimethylsilane, or a combination thereof. Specific examples of suitable species for the (E) hydrosilylation-reaction inhibitor include, but are not limited to, trans-stilbene, cis-stilbene, diphenylacetylene, 3,3-dimethyl-1-butyne, bicyclo[2.2.1]hept-2-ene, bicyclo[2.2.1]hepta-2,5-diene, cyclohexylacetylene, 1-ethynylcyclohexene, benzyl alcohol, acetylacetone, 2,4,7,9-tetramethyl-5-decyne-4,7-diol, 2-butyn-1-ol, 4-pentyn-1-ol, 2-butyne-1,4-diol, methyl propargyl ether, 3-butyn-1-ol, propargyl alcohol, 3-butyn-2-ol, 3-methyl-1-penten-4-yn-3-ol, 3,3-diethoxy-1-propyne, 2-methyl-3-butyn-2-ol, 3,5-dimethyl-1-hexyn-3-ol, 1-ethynylcyclopentanol, 1-ethynyl-1-cyclohexanol, 1-phenyl-2-propyn-1-ol, 2-phenyl-3-butyn-2-ol, 1,1-diphenyl-2-propyn-1-ol, tetraethyl ethylenetetracarboxylate, ethyl cinnamate, ethyl sorbate, 1,4-naphthoquinone, maleic anhydride, diethyl fumarate, diethyl maleate, diallyl fumarate, diallyl maleate, 2-butyne-1,4-diol diacetate, methyl propiolate, ethyl propiolate, ethyl phenylpropiolate, dimethyl acetylenedicarboxylate, diethyl acetylenedicarboxylate, di-tert-butyl acetylenedicarboxylate, 2,4,6,8-tetramethyl-2,4,6,8-tetravinylcyclotetrasiloxane, tetracyanoethylene, 1,3,5-triallyl-1,3,5-triazine-2,4,6(1H,3H,5H)-trione, 3-dimethylamino-1-propyne, n-methylpropargylamine, propargylamine, and 1-ethynylcyclohexylamine.

The (E) hydrosilylation-reaction inhibitor may be one inhibitor compound. Alternatively, a combination of two or more different compounds may be utilized together or in combination as the (E) hydrosilylation-reaction inhibitor. The (E) hydrosilylation-reaction inhibitor is typically present in the curable composition in an amount sufficient to prevent the reaction of the (A) additive organopolysiloxane composition, the (B) organosilicon compound and, if present, the (D) organopolysiloxane, at ambient conditions (e.g., room temperature of 25±5° C., RT, and atmospheric pressure). At least some reaction may occur despite the presence of the (E) hydrosilylation-reaction inhibitor, but the curable composition remains curable until application of a curing condition. However, the curable composition may comprises the (E) hydrosilylation-reaction inhibitor in an amount of from greater than 0 to 15%, alternatively from 0.01% to 10%, based on total weight of the curable composition. Alternatively, the curable composition may comprise the (E) hydrosilylation-reaction inhibitor in a molar ratio of at least 20:1, alternatively at least 25:1, alternatively at least 30:1, of the (E) hydrosilylation-reaction inhibitor relative to the (C) hydrosilylation-reaction catalyst.

The curable composition may further comprise (F) an anchorage additive. Suitable anchorage additives include a transition metal chelate, a hydrocarbonoxysilane such as an alkoxysilane, a combination of an alkoxysilane and a hydroxy-functional polyorganosiloxane, or a combination thereof. Anchorage additives are known in the art and may comprise silanes including at least one SiC bonded substituent having an adhesion-promoting group, such as, epoxy, acetoxy or acrylate groups. The adhesion-promoting group may additionally or alternatively be any hydrolysable group which does not impact the (C) hydrosilylation catalyst. Alternatively, the (F) anchorage additive may comprise a partial condensate of such a silane, e.g., an organopolysiloxane having an adhesion-promoting group. Alternatively still, the (F) anchorage additive may comprise a combination of an alkoxysilane and a hydroxy-functional polyorganosiloxane.

Alternatively, the (F) anchorage additive may comprise an unsaturated or epoxy-functional compound. The (F) anchorage additive may comprise an unsaturated or epoxy-functional alkoxysilane. For example, the functional alkoxysilane can include at least one unsaturated organic group or an epoxy-functional organic group. Epoxy-functional organic groups are exemplified by 3-glycidoxypropyl and (epoxycyclohexyl)ethyl. Unsaturated organic groups are exemplified by 3-methacryloyloxypropyl, 3-acryloyloxypropyl, and unsaturated monovalent hydrocarbon groups such as vinyl, allyl, hexenyl, undecylenyl. One specific example of an unsaturated compound is vinyltriacetoxysilane.

Specific examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

The (F) anchorage additive may also comprise the reaction product or partial reaction product of one or more of these compounds. For example, in a specific embodiment, the (F) anchorage additive may comprise the reaction product or partial reaction product of vinyltriacetoxysilane and 3-glycidoxypropyltrimethoxysilane. Alternatively or in addition, the (F) anchorage additive may comprise alkoxy or alkenyl functional siloxanes.

Alternatively, the (F) anchorage additive may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The (F) anchorage additive may comprise a combination of an epoxy-functional alkoxysilane and an epoxy-functional siloxane. For example, the (F) anchorage additive is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the (F) anchorage additive may comprise a transition metal chelate. Suitable transition metal chelates include titanates, zirconates such as zirconium acetylacetonate, aluminum chelates such as aluminum acetylacetonate, and combinations thereof. Alternatively, the (F) anchorage additive may comprise a combination of a transition metal chelate with an alkoxysilane, such as a combination of glycidoxypropyltrimethoxysilane with an aluminum chelate or a zirconium chelate.

Suitable anchorage additives and methods for their preparation are disclosed, for example, in U.S. Pat. No. 9,562,149, to Cray et al.; U.S. Patent Application Publication Numbers 2003/0088042, to Griswold et al., 2004/0254274 to Griswold, 2005/0038188 to Ahn, et al., 2012/0328863 at paragraph [0091] to Kuo, and U.S. Patent Publication 2017/0233612 at paragraph [0041] to Han, et al.; and EP 0 556 023 to Stein. Anchorage additives are commercially available. For example, SYL-OFF™ 297, SYL-OFF™ 397, and SYL-OFF™ 9176 are available from Dow Silicones Corporation of Midland, Mich., USA. Other exemplary anchorage additives include F-1) vinyltriacetoxysilane, F-2) glycidoxypropyltrimethoxysilane, F-3) 2-(3,4-epoxycyclohexyl)ethyltrimethoxysilane, F-4) a combination of two or more of F-1), F-2) and F-3); and F-5) a combination of any of F-1), F-2), F-3) and/or F-4), and a polydimethylsiloxane terminated with hydroxyl groups, methoxy groups, or terminated with both a hydroxy group and a methoxy group. The combinations F-4) and F-5) may be physical blends and/or reaction products.

The curable composition may further comprise (G) an anti-mist additive. The (G) anti-mist additive may be any compound or component suitable for reducing, minimizing, or eliminating misting during applications of the curable composition. For example, when the curable composition is solventless, high speed application of the curable composition to a substrate via a coating head or applicator may result in generation of mist from the curable composition.

The (G) anti-mist additive comprises an anti-mist organopolysiloxane. The anti-mist organopolysiloxane is different from the components of the (A) additive organopolysiloxane composition and the (D) organopolysiloxane, if present in the curable composition. In a specific embodiment, the (G) anti-mist additive comprises a Q-branched dimethylvinyl terminated organopolysiloxane. The (G) anti-mist additive may have a viscosity of from 30,000 to 50,000, alternatively from 35,000 to 45,000, centipoise at 25° C. Suitable anti-mist additives and methods for their preparation are known in the art, for example, in U.S. Patent Application 2011/0287267 to Hori. et al.; U.S. Pat. No. 8,722,153 to Ekeland; U.S. Pat. No. 6,805,914 to Clark. et al.; U.S. Pat. No. 6,586,535 to Clark, et al.; U.S. Pat. No. 6,489,407 to Clark, et al.; and U.S. Pat. No. 5,625,023 to Chung, et al.

The curable composition may further comprise (H) a solvent. Suitable solvents include, polyalkylsiloxanes, alcohols, ketones, aromatic hydrocarbons, aliphatic hydrocarbons, glycol ethers, tetrahydrofuran, mineral spirits, naphtha, tetrahydrofuran, mineral spirits, naphtha, or a combination thereof. Polyalkylsiloxanes with suitable vapor pressures may be used as the solvent, and these include hexamethyldisiloxane, octamethyltrisiloxane, hexamethylcyclotrisiloxane and other low molecular weight polyalkylsiloxanes, such as 0.5 to 1.5 cSt DOWSIL™ 200 Fluids and DOWSIL™ OS FLUIDS, which are commercially available from Dow Silicones Corporation of Midland, Mich., U.S.A.

Alternatively, starting material (H) may comprise an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, tetrahydrofuran; mineral spirits; naphtha; or a combination thereof.

The amount of solvent will depend on various factors including the type of solvent selected and the amount and type of other starting materials selected for the curable composition. However, the amount of solvent may be 0% to <10%, based on combined weights of all starting materials in the curable composition. The solvent may be added during preparation of the curable composition, for example, to aid mixing and delivery of one or more starting materials. For example, the catalyst may be delivered in a solvent. All or a portion of the solvent may optionally be removed after the curable coating composition is prepared. Alternatively, a customer may dilute the curable composition after receipt and before use, and in this instance the amount of solvent for dilution may be ≥10%.

The curable composition may further comprise one or more other optional additives such as colorants; dyes; pigments; fillers, such as silica, quartz, or chalk; non-reactive silicone fluids; preservatives; and/or fragrances. Alternatively, the curable composition may comprise only components (A)-(C), alternatively only components (A)-(D), alternatively only components (A)-(E), alternatively components (A)-(E) and optionally any of (F), (G), and/or (H). Alternatively, when the curable composition is to be used to prepare a release coating, the curable composition may be a release coating composition comprising components (A), (B), (C), (D), and (E), described above, and the release coating composition may further comprise one or more of components (F), (G), and (H), also described above.

Alternatively, the curable composition described herein may be free from fluoroorganosilicone compounds. It is believed that, during the cure, a fluorocompound, because of its low surface tension, will rapidly migrate to the interface of a coating composition and a substrate, for example a release coating composition/PET film interface, and prevent adherence of the release coating (prepared by curing the release coating composition) to the substrate by making a fluorine containing barrier. By making a barrier, the fluorocompound prevents any component from reacting at the interface. Moreover, fluoroorganosilicone compounds are usually expensive.

A method of preparing the curable composition is also provided. The method comprises combining the (A) additive organopolysiloxane, the (B) organosilicon compound having at least two silicon-bonded hydrogen atoms per molecule, and the (C) hydrosilylation catalyst to give the curable composition. When components (D), (E), (F), (G), and/or (H) are also present in the curable composition, the method comprises combining such components along with components (A), (B), and (C).

The components may be combined via any suitable technique and in any order of addition. Alternatively, the (E) hydrosilylation-reaction inhibitor is utilized and combined with the other components prior to incorporation of the (C) hydrosilylation catalyst. In the absence of the (E) hydrosilylation-reaction inhibitor, the components of the curable composition may begin to react in the presence of the (C) hydrosilylation catalyst once combined. Alternatively, the (C) hydrosilylation catalyst is not combined with the (A) additive organopolysiloxane composition, the (B) organosilicon compound, or the (D) organopolysiloxane until after incorporation of the (E) hydrosilylation-reaction inhibitor. The curable composition may be a one component (1 k), two component (2 k), or multi-component system.

Alternatively, the curable composition can be prepared for example by combining components comprising all or a portion of component (A) with component (C) as a first mixture, and mixing component (B) optionally with another portion of component (A) as a second mixture. The first and second mixtures are not reactive until combined to give the curable composition. Alternatively each of the components may be stored and supplied separately. When the curable composition does not include the (E) hydrosilylation-reaction inhibitor, the curable composition is typically prepared immediately prior to end use application. In contrast, inclusion of the (E) hydrosilylation-reaction inhibitor extends shelf-life and stability of the curable composition.

The present invention also provides method of forming a film. The film may alternatively be referred to as a coating, as the film is formed on a substrate. The film may also be a release liner or liner depending on end use applications thereof, for example, when the curable composition is formulated as a release coating composition. The film may be peelable from the substrate, or may be chemically and/or physically bonded to the substrate.

The method comprises applying the curable composition on a substrate to give a deposit. The method further comprises forming a film on the substrate from the deposit.

The substrate is not limited and may be any substrate depending on an end use application of the film. Examples of suitable substrates include cellulosic materials, such as paper, cardboard and wood; metals, such as aluminum, iron, steel, or an alloy thereof; siliceous materials, such as ceramics, glass and concrete. The substrate may also be a plastic substrate. Specific examples of suitable plastic substrates include polyamides (PA); polyesters such as polyethylene terephthalates (PET), polybutylene terephthalates (PET), polytrimethylene terephthalates (P'), polyethylene naphthalates (PEN), and liquid crystalline polyesters; polyolefins such as polyethylenes (PE), polyethylene-octene copolymers, polypropylenes (PP), and polybutylenes; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers thereof, and combinations thereof.

In view of the excellent controlled release properties of the film, the substrate may be selected based on desired end use applications involving pressure sensitive adhesives. For example, pressure sensitive adhesives may be controllably released from the film, and thus the film may be utilized to form tapes or other substrates for pressure sensitive adhesives. In these embodiments, the substrate may be flexible. However, the substrate may alternatively be rigid, or a combination of rigid and flexible. The substrate may be continuous or discontinuous in any property or dimension.

Typically, the curable composition is applied to the substrate in wet form via a wet coating technique. In certain embodiments, the composition is applied by i) spin coating; ii) brush coating; iii) drop coating; iv) spray coating; v) dip coating; vi) roll coating; vii) flow coating; viii) slot coating;

ix) gravure coating; or x) a combination of any two or more of i) to ix). Alternatively, when the substrate is flexible, e.g., paper, the wet coating technique may utilize a trailing blade coater, kiss rolls, gravure rolls, and/or offset printing rolls.

Alternatively, the amount of the curable composition applied to the substrate is an amount of 0.1 to 2.0 grams per square meter of surface of the substrate.

The deposit formed by applying the curable composition is typically an uncured film. The uncured film may have undergone at least partial curing, but remains curable upon application of a curing condition (e.g., heat).

Forming the film from the deposit generally comprises curing the deposit. The deposit is typically cured at an elevated temperature for a period of time. The elevated temperature is typically from 50° C. to 300° C., alternatively from 100° C. to 250° C., alternatively from 150° C. to 200° C. The period of time is typically sufficient to effect curing. i.e., cross-linking, of the deposit comprising the curable composition. Alternatively, the period of time is a function of dimensions of the deposit. Alternatively, the period of time is less than 1 minute, alternatively less than 30 seconds, alternatively less than 15 seconds, alternatively less than 10 seconds, alternatively less than 5 seconds. The source of heat may be any suitable source. For example, the substrate may be heated such that the deposit cures upon contact with the substrate. Alternatively, the substrate and deposit may be placed in or passed through an oven.

Depending on a thickness and other dimensions of the deposit and film, the film could also be formed via an iterative process, e.g., by repeating the coating and curing steps described above. The method for forming the film may optionally further comprise one or more additional steps, e.g., treating the surface of substrate before applying the curable composition thereto. Treating may be performed by any convenient means such as applying a primer and/or plasma treatment. If the curable composition contains the (H) solvent, then all or a portion of the solvent may be removed after applying the curable composition to the surface of the substrate and before curing the curable composition.

Alternatively, an adhesive may be laminated on the film formed from the deposit. The adhesive may be any adhesive, e.g. an acrylate-based adhesive and/or a silicone-based adhesive. The film of the present invention advantageously delivers high release force. For example, the release force of the film herein may be ≥40 grams/inch (g/in), alternatively 40 g/n to 400 g/n, alternatively 40 g/in to 300 g/n, alternatively 40 g/in to 200 g/n, alternatively 50 g/in to 200 g/in, alternatively 60 g/n to 200 g/n, and alternatively 70 g/in to 200 g/n, as measured according to Example 3, below.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

Various additive organopolysiloxane compositions are prepared in accordance with the subject disclosure. More specifically, additive organopolysiloxane compositions are prepared and utilized for purposes of preparing curable compositions in accordance with the subject disclosure. Other additive organopolysiloxane compositions, and curable compositions prepared therefrom, are also prepared and compared to the additive organopolysiloxane compositions and curable compositions of the subject disclosure.

EXAMPLES

The following examples are intended to illustrate the invention and are not to be viewed in any way as limiting to the scope of the invention. Components used in the examples are described below in Table 1.

TABLE 1

| Component | Product Name | Product Description |
|---|---|---|
| Additive Organopolysiloxane Composition Samples | SYL-OFF ™ 7210 release modifier diluted with xylene | 54% vinyl functional silicone resin with 46% xylene |
| | SYL-OFF ™ SL 40 release modifier diluted with 1-tetradecene | 54% vinyl functional silicone resin with 46% 1-tetradecene |

TABLE 1-continued

| Component | Product Name | Product Description |
|---|---|---|
| | DOWSIL ™ 6-3444 Int + Siloxane 1 + DOWSIL ™ 4-2776 | 54% vinyl functional silicone resin with 36% Siloxane 1 and 10% divinyltetramethyldisiloxane prepared by stripping xylene out of DOWSIL ™ 6-3444 Int as provided and diluting with Siloxane 1 and DOWSIL ™ 4-2776, described below |
| | DOWSIL ™ 6-3444 Int + Siloxane 1 + DOWSIL ™ OS-20 | 54% vinyl functional silicone resin with 36% Siloxane 1 and 10% 1,1,1,3,3,5,5,5-octamethyltrisiloxane prepared by stripping xylene out of DOWSIL ™ 6-3444 Int as provided and diluting with Siloxane 1 and DOWSIL ™ OS-20 |
| | DOWSIL ™ 6-3444 Int + Siloxane 1 + DOWSIL ™ 1-2287 Int | 54% vinyl functional silicone resin with 36% Siloxane 1 and 10% Tetramethyltetravinylcyclotetrasiloxane prepared by stripping xylene out of DOWSIL ™ 6-3444 Int as provided and diluting with Siloxane 1 and DOWSIL ™ 1-2287 Int |
| | DOWSIL ™ 6-3444 Int + Siloxane 1 + DOWSIL ™ 1-2287 Int | 32.4% vinyl functional silicone resin with 21.6% Siloxane 1 and 46% 1,3,5,7-tetramethyl-1,3,5,7-tetravinylcyclotetrasiloxane prepared by stripping xylene out of DOWSIL ™ 6-3444 Int as provided and diluting with Siloxane 1 and DOWSIL ™ 1-2287 Int |
| Base | DOWSIL ™ 7226 Dispersion | 30% vinyl functional dimethyl silicone gum + 0.2% inhibitor Methyl butynol + 0.65% Methylhydrogen Siloxane, Trimethylsiloxy-terminated + 69.15% toluene |
| Anchorage Additive | DOWSIL ™ 297 | alkoxy containing alkenyl/epoxy functional organopolysiloxane anchorage promoter |
| SiH crosslinker | SYL-OFF ™ 7028 | Methylhydrogen Siloxane, Trimethylsiloxy-terminated, 20 mPa · s |
| Solvent | Toluene | |
| Catalyst | SYL-OFF ™ 4000 Catalyst | Pt containing catalyst |
| Q-Branched Polymer | Siloxane 1 | Siloxane composed of units of formulae $(SiO_{4/2})$ Q, $(Me_2SiO_{2/2})$ D, $(MeViSiO_{2/2})$ $D^{vi}$, $(Me_3SiO_{1/2})$ M, $(Me_2ViSiO_{1/2})$ $M^{vi}$ units, with viscosity of 220 mPa · s, Vi % = 1.23% |
| Vinyl Functional MQ Resin | DOWSIL ™ 6-3444 Int | Vinyl, methyl functional polyorganosilicate resin dissolved in xylene |
| DVTMS | DOWSIL ™ 4-2776 | 1,3-divinyl-1,1,3,3-tetramethyldisiloxane |
| MDM | DOWSIL ™ OS-20 | 1,1,1,3,3,5,5,5-octamethyltrisiloxane |
| $D^{Vi}_4$ | DOWSIL ™ 1-2287 Int | 1,3,5,7-tetravinyl-1,3,5,7-tetramethylcyclotetrasiloxane |

In Table 1, starting materials branded DOWSIL™ and SYL-OFF™ are commercially available from Dow Silicones Corporation of Midland, Mich., USA.

Preparation Example 1: Additive Organopolysiloxane Compositions

In general, the additive organopolysiloxane compositions were prepared by combining a branched organopolysioxane polymer, an organic solvent-borne silicone resin, and a polydiorganosiloxane together in a jar at RT to form a mixture. The mixture was then stripped using a wipe film evaporator (120-150° C.; <1 Torr), and optionally combined with an additional amount of organopolysiloxane polymer (organopolysiloxane polymer 2), to give the particular additive organopolysiloxane composition.

Different additive organopolysiloxane compositions were prepared according to the general procedure described 1 above. The specific organopolysiloxane polymers and silicone resins utilized to prepare the different additive organopolysiloxane compositions, along with their respective amounts, are shown below in Table 2.

Example 2—Preparation of Release Coating Composition Samples

TABLE 2

| | Additive Organopolysiloxane Composition Samples | | | | | | |
|---|---|---|---|---|---|---|---|
| | (A1) Q-Branched Polymer (g) | (A2) Vinyl functional MQ resin (g) | Tetradecene (g) | Xylene (g) | (A3) DVTMS (g) | (A3) MDM (g) | (A3) $D_4^{Vi}$ (g) |
| Comparative Example 1 (CE3) | 0 | 26.6 | 0 | 22.6 | 0 | 0 | 0 |
| Comparative Example 2 (CE4) | 0 | 22.6 | 22.6 | 0 | 0 | 0 | 0 |

TABLE 2-continued

Additive Organopolysiloxane Composition Samples

| | (A1) Q-Branched Polymer (g) | (A2) Vinyl functional MQ resin (g) | Tetradecene (g) | Xylene (g) | (A3) DVTMS (g) | (A3) MDM (g) | (A3) $D_4^{Vi}$ (g) |
|---|---|---|---|---|---|---|---|
| Comparative Example 3 (CE5) | 90.6 | 65.6 | 0 | 0 | 0 | 0 | 0 |
| Working Example 1 (IE7) | 43.7 | 65.6 | 0 | 0 | 12.1 | 0 | 0 |
| Working Example 2 (IE8) | 43.7 | 65.6 | 0 | 0 | 0 | 12.1 | 0 |
| Working Example 3 (IE9) | 43.7 | 65.6 | 0 | 0 | 0 | 0 | 12.1 |
| Working Example 4 (IE10) | 43.7 | 65.6 | 0 | 0 | 0 | 0 | 93 |
| Working Example 5 (IE11) | 43.7 | 65.6 | 0 | 0 | 0 | 0 | 12.1 |

The additive organopolysiloxane compositions prepared as described above in Preparation Example 1 were formulated into Release Coating Compositions in a Release Coating Bath according to the following procedure:

I. The (D) gum/polymer with the (E) inhibitor, the (A) additive organopolysiloxane composition in the amount prepared as shown in Table 2, the (F) anchorage additive, and the (D) SiH crosslinker according to the formulation in Table 3 were added to a beaker and mixed until homogeneous. A suitable amount of solvent was added, if needed.

II. Adding SYL-OFF 4000 catalyst in an amount sufficient to provide 140 ppm Pt to the release coating composition was added into the above mixture, and the beaker contents were mixed for 10 minutes.

III. The resulting release coating composition bath was coated on a PET substrate by a coater and then thermal addition cured in an oven (at 140 degree C. for 30 seconds).

In Working Example 5, the inhibitor was ETCH instead of methyl butynol.

Example 3—Evaluation of Release Coatings

The release coating composition samples described in Table 3 were evaluated for coat weight, release force after aging at RT, release force after aging at 70° C. and subsequent adhesion strength according to the following test methods:

(1) Coat weight (CW): use X-Ray to detect the coat weight of silicone by Oxford lab-x 3500 instrument manufactured by Oxford Instruments PLC, Oxon, United Kingdom. Use uncoated PET as blank. Refer to FINAT Test Method No. 7 (FINAT Technical Handbook 7th edition, 2005).

(2) Release force (RF-RT): the 180 degree peeling test is used to measure release force from liner with Tesa 7475 standard tape which was laminated on coated release coating, loaded weight of 20 g/cm² on laminated sample and left under RT (room temperature) for 20 hours. After 20 hours,

TABLE 3

Release Coating Compositions: with amounts of each component in grams, except catalyst, which is an amount sufficient to provide 140 ppm.

| | (D) Gum/Polymer | (E) Inhibitor | (F) Anchorage Additive | (B) SiH Crosslinker DOWSIL 7028 | (H) toluene |
|---|---|---|---|---|---|
| Comparative Example 1 (CE3) | 30 | 0.2 | 0.57 | 1.51 | As needed to reach target coat weight |
| Comparative Example 2 (CE4) | 30 | 0.2 | 0.57 | 1.51 | As needed to reach target coat weight |
| Comparative Example 3 (CE5) | 30 | 0.2 | 0.57 | 11.8 | As needed to reach target coat weight |
| Working Example 1 (IE7) | 30 | 0.2 | 0.57 | 4.79 | As needed to reach target coat weight |
| Working Example 2 (IE8) | 30 | 0.2 | 0.57 | 4.79 | As needed to reach target coat weight |
| Working Example 3 (IE9) | 30 | 0.2 | 0.57 | 4.79 | As needed to reach target coat weight |
| Working Example 4 (IE10) | 30 | 0.2 | 0.57 | 4.79 | As needed to reach target coat weight |
| Working Example 5 (IE11) | 0 | 0.18* | 0.57 | 4.64 | 0 | remove the load and wait for 30 minutes. Then test the release force by ChemInstruments AR-1500. Refer to FINAT Test Method No. 10 (FINAT Technical Handbook 7th edition, 2005).

(3) Release force (RF-70° C. aging): the 180 degree peeling test is used to measure release force from liner with Tesa 7475 standard tape which was laminated on coated release coating, loaded weight of 20 g/cm$^2$ on laminated sample and left under 70° C. for 20 hours. After 20 hours, remove the load and wait for 30 minutes. Then test the release force by ChemInstruments AR-1500. Refer to FINAT Test Method No. 10 (FINAT Technical Handbook 7th edition, 2005).

(4) SAS (Subsequent Adhesive Strength, indicator of migration): test tape is laminated by Nitto Denko 31B tape on coated release coating, load weight of 20 g/cm$^2$ and left under 70° C. for 20 hours. After 20 hours, remove the load and wait for 30 minutes at room temperature. Then transfer the 31B tape on PET substrate and wait for another 1 hour. Test the release force by ChemInstruments AR-1500. In SAS test, laminate 31B tape on PTFE substrate and treat the PTFE sample the same way as release coating sample. The SAS value is recorded as $RF_{release}/RF_{PTF}\times 100\%$. Refer to FINAT Test Method No. 11 (FINAT Technical Handbook 7th edition, 2005).

TABLE 4

Release Coating Performance

| | Comp. Ex. 1 | Comp. Ex. 2 | Comp. Ex. 3 | Work. Ex. 1 | Work. Ex. 2 | Work. Ex. 3 | Work. Ex. 4 | Work. Ex. 5 |
|---|---|---|---|---|---|---|---|---|
| C/W g/m2 | 0.311 | 0.307 | 0.390 | 0.324 | 0.320 | 0.336 | 0.365 | 0.428 |
| RF-RT g/in | 124.200 | 125.633 | 34.833 | 122.933 | 121.200 | 113.667 | 110.500 | 89.067 |
| RF-70 C. g/in | 120.033 | 120.033 | 43.500 | 124.700 | 126.033 | 136.800 | 135.200 | 155.700 |
| SAS % | 90.6 | 90.9 | 95.2 | 95.3 | 95.0 | 96.1 | 95.5 | 97.4 |

The results of Comparative Examples 1 and 2 in Table 4 show that when the additive organopolysiloxane composition does not include the (A1) branched organopolysiloxane polymer, then the release coating produced therewith has an SAS % that is too low under the conditions tested. Comparative Example 3 showed that when the additive organopolysiloxane composition does not include the (A3) polydiorganosiloxane, then the release force after aging both at RT and at 70° C. was too low under the conditions tested. The working examples 1-5 showed that both solvent-borne and solventless release coating compositions prepared including the (A) additive organopolysiloxane composition according to this invention could be prepared with high release force after aging at 70° C.

INDUSTRIAL APPLICABILITY

The examples above show that release coatings can be prepared from release coating compositions containing the additive organopolysilxoane described herein. These release coatings have the beneficial combination of properties of stable high release (e.g., after aging bot at RT and 70 C). All working examples had release force >85 g/in after aging at RT and >120 g/n after aging at 70 C. Furthermore, the release coatings of the working examples had low migration as evidenced by having >95% SAS.

What is claimed is:

1. An (A) additive organopolysiloxane composition comprising:

(A1) a branched organopolysiloxane polymer having unit formula $(R^1{}_{3-x}R^2{}_xSiO_{1/2})_a(R^1{}_{2-y}R^2{}_ySiO_{2/2})_b(SiO_{4/2})_c$ wherein each $R^1$ independently is a substituted or unsubstituted hydrocarbyl group; each $R^2$ independently is an aliphatically unsaturated group; subscript x represents number of aliphatically unsaturated groups in the unit of formula $(R^1{}_{3-x}R^2{}_xSiO_{1/2})$, x has a value from 0 to 3, subscript y represents number of aliphatically unsaturated groups in the unit of formula $(R^1{}_{2-y}R^2{}_ySiO_{2/2})$, y has a value from 0 to 2, with the proviso that subscript x and subscript y are not simultaneously 0; with the proviso that the branched organopolysiloxane polymer has at least 3 groups $R^2$ per molecule; subscripts a, b, and c represent mole fractions of each unit in the unit formula, and subscripts a, b, and c have values such that $0 < a \le 0.3$, $0.4 \le b \le 0.97$, and $0 < c \le 0.3$, with the proviso that $a+b+c=1$; and (A2) a silicone resin comprising unit formula $(R^1{}_{3-z}R^2{}_zSiO_{1/2})_d(SiO_{4/2})_e$ wherein each $R^1$ independently is a substituted or unsubstituted hydrocarbyl group; each $R^2$ independently is an aliphatically unsaturated group; subscript z represents number of aliphatically unsaturated groups in the unit of formula $(R^1{}_{3-z}R^2{}_zSiO_{1/2})$, subscript z has a value from 0 to 3, subscripts d and e represent mole fractions of each unit in the unit formula, subscripts d and e have values such that $0.2 \le d \le 0.7$, $0.3 \le e \le 0.8$, with the proviso that $d+e=1$; with the proviso that said (A2) silicone resin includes a content of $R^2$ of from 1.5 to 7.0 weight percent (wt. %) based on the total weight of said (A2) silicone resin; and where starting materials (A1) and (A2) are present in amounts sufficient to provide a weight ratio of resin/polymer (A2)/(A1) of 0.8/1 to 2.0/1;

(A3) >0 to 50 weight % of a polydiorganosiloxane having unit formula $(R^1{}_2R^2SiO_{1/2})_f(R^1{}_3SiO_{1/2})_g(R^1R^2SiO_{2/2})_h(R^1{}_2SiO_{2/2})_i$, wherein each $R^1$ independently is a substituted or unsubstituted hydrocarbyl group; each $R^2$ independently is an aliphatically unsaturated group; subscripts f, g, h, and i represent numbers of each unit in the unit formula and have values such that $f \ge 0$, $g \ge 0$, $h \ge 0$, $i \ge 0$, and $2 \ge f+g+h+i \ge 4$.

2. The additive organopolysiloxane composition of claim 1, wherein in the unit formula for said (A3) polydiorganosiloxane:

(i) h=4, and said (A3) polydiorganosiloxane is cyclic and has unit formula $(R^1R^2SiO_{2/2})_4$, wherein each $R^1$ independently is a substituted or unsubstituted hydrocarbyl group; each $R^2$ independently is an aliphatically unsaturated group; or (ii) f=2, and said (A3) polydiorganosiloxane is a linear aliphatically unsaturated polydiorganosiloxane oligomer of formula $R^1{}_2R^2Si$—O—$(R^1{}_2Si$—O$)_i$—$SiR^1{}_2R^2$, where each $R^1$ independently is a substituted or unsubstituted hydrocarbyl group; each $R^2$ independently is an aliphatically unsaturated group; and subscript i is 0 or 1; or (iii) g=2, and said (A3) polydiorganosiloxane is a linear polydiorganosiloxane oligomer of formula $R^1{}_3Si$—O—$(R^1{}_2Si$—O$)_i$—$SiR^1{}_3$, where each $R^1$ independently is a substituted or unsubstituted hydrocarbyl group; and subscript i is 0 or 1.

3. The additive organopolysiloxane composition of claim 1, wherein:
  (i) said (A) additive organopolysiloxane composition consists essentially of said (A1) branched organopolysiloxane polymer, said (A2) silicone resin, and (A3) said polydiorganosiloxane;
  (ii) said (A) additive organopolysiloxane composition comprises said (A1) branched organopolysiloxane polymer in an amount of from 20 weight % to 60 weight %, said (A2) silicone resin in an amount of from 30 weight % to 70 weight %, and said (A3) polydiorganosiloxane in an amount of from 5 weight % to 15 weight %, based on combined weights of components (A1), (A2), and (A3) in said (A) additive organopolysiloxane composition; or
  (iii) both (i) and (ii).

4. A release coating composition, comprising:
  (A) an additive organopolysiloxane composition, said (A) additive organopolysiloxane being that of claim 1;
  (B) an organosilicon compound having at least two silicon-bonded hydrogen atoms per molecule;
  (C) a hydrosilylation catalyst;
  (D) an organopolysiloxane having at least two silicon-bonded aliphatically unsaturated groups per molecule; and
  (E) a hydrosilylation-reaction inhibitor.

5. The release coating composition of claim 4, further comprising an additional starting material selected from the group consisting of (F) an anchorage additive; (G) an anti-mist additive; (H) a solvent, and a combination of two or more of (F), (G), and (H).

6. The release coating composition of claim 4, wherein in (A) the additive organopolysiloxane composition in the unit formula for said (A3) polydiorganosiloxane:
  (i) h=4, and said (A3) polydiorganosiloxane is cyclic and has unit formula $(R^1R^2SiO_{2/2})_q$, wherein each $R^1$ independently is a substituted or unsubstituted hydrocarbyl group; each $R^2$ independently is an aliphatically unsaturated group; or
  (ii) f=2, and said (A3) polydiorganosiloxane is a linear aliphatically unsaturated polydiorganosiloxane oligomer of formula $R^1{}_2R^2Si$—O—$(R^1{}_2Si$—O$)_i$—$SiR^1{}_2R^2$, where each $R^1$ independently is a substituted or unsubstituted hydrocarbyl group; each $R^2$ independently is an aliphatically unsaturated group; subscript i is 0 or 1; or
  (iii) g=2, and said (A3) polydiorganosiloxane is a linear polydiorganosiloxane oligomer of formula $R^1{}_3Si$—O—$(R^1{}_2Si$—O$)_i$—$SiR^1{}_3$, where each $R^1$ independently is a substituted or unsubstituted hydrocarbyl group; and subscript i is 0 or 1.

7. The release coating composition of claim 4, wherein in the additive organopolysiloxane composition:
  (i) said (A) additive organopolysiloxane composition consists essentially of said (A1) branched organopolysiloxane polymer, said (A2) silicone resin, and (A3) said polydiorganosiloxane;
  (ii) said (A) additive organopolysiloxane composition comprises said (A1) branched organopolysiloxane polymer in an amount of from 20 weight % to 60 weight %, said (A2) silicone resin in an amount of from 30 weight % to 70 weight %, and said (A3) polydiorganosiloxane in an amount of from 5 weight % to 15 weight %, based on combined weights of components (A1), (A2), and (A3) in said (A) additive organopolysiloxane composition; or
  (iii) both (i) and (ii).

8. The additive organopolysiloxane composition of claim 1, where the weight ratio of resin/polymer (A2)/(A1) is 0.8/1 to 1.6/1.

9. A curable composition, comprising:
  (A) an additive organopolysiloxane composition, said (A) additive organopolysiloxane composition comprising:
  (A1) a branched organopolysiloxane polymer having unit formula $(R^1{}_{3-x}R^2{}_xSiO_{1/2})_a(R^1{}_{2-y}R^2{}_ySiO_{2/2})_b(SiO_{4/2})_c$ wherein each $R^1$ independently is a substituted or unsubstituted hydrocarbyl group; each $R^2$ independently is an aliphatically unsaturated group; subscript x represents number of aliphatically unsaturated groups in the unit of formula $(R^1{}_{3-x}R^2{}_xSiO_{1/2})$, x has a value from 0 to 3, subscript y represents number of aliphatically unsaturated groups in the unit of formula $(R^2{}_{2-y}R^2{}_ySiO_{2/2})$, y has a value from 0 to 2, with the proviso that subscript x and subscript y are not simultaneously 0; with the proviso that the branched organopolysiloxane polymer has at least 3 groups $R^2$ per molecule; subscripts a, b, and c represent mole fractions of each unit in the unit formula, and subscripts a, b, and c have values such that 0<a≤0.3, 0.4≤b≤0.97, and 0<c≤0.3, with the proviso that a+b+c=1; and (A2) a silicone resin comprising unit formula $(R^1{}_{3-z}R^2{}_zSiO_{1/2})_d(SiO_{4/2})_e$ wherein each $R^1$ independently is a substituted or unsubstituted hydrocarbyl group; each $R^2$ independently is an aliphatically unsaturated group; and subscript z represents number of aliphatically unsaturated groups in the unit of formula $(R^1{}_{3-z}R^2{}_zSiO_{1/2})$, subscript z has a value from 0 to 3, subscripts d and e represent mole fractions of each unit in the unit formula, subscripts d and e have values such that 0.2≤d≤0.7, 0.3≤e≤0.8, with the proviso that d+e=1; with the proviso that said (A2) silicone resin includes a content of $R^2$ of from 1.5 to 7.0 weight percent (wt. %) based on the total weight of said (A2) silicone resin; and where starting materials (A1) and (A2) are present in amounts sufficient to provide a weight ratio of resin/polymer (A2)/(A1) of 0.8/1 to 2.0/1;

(A3) >0 to 50 weight % of a polydiorganosiloxane having unit formula $(R^1{}_2R^2SiO_{1/2})_f(R^1{}_3SiO_{1/2})_g(R^1R^2SiO_{2/2})_h(R^1{}_2SiO_{2/2})_i$, wherein each $R^1$ independently is a substituted or unsubstituted hydrocarbyl group; each $R^2$ independently is an aliphatically unsaturated group; subscripts f, g, h, and i represent numbers of each unit in the unit formula and have values such that f≥0, g≥0, h≥0, i≥0, and 2≥f+g+h+i≥4;
(B) an organosilicon compound having at least two silicon-bonded hydrogen atoms per molecule; and
(C) a hydrosilylation catalyst.

10. The curable composition of claim 9, further comprising an additional component selected from the group consisting of (D) an organopolysiloxane having at least two silicon-bonded aliphatically unsaturated groups per molecule; (E) a hydrosilylation-reaction inhibitor, (F) an anchorage additive; (G) an anti-mist additive; (H) a solvent; and any combination of two or more of (D)-(H).

11. The curable composition of claim 10, wherein said (D) organopolysiloxane having at least two silicon-bonded aliphatically unsaturated groups per molecule is present.

12. The curable composition of claim 10, wherein:
(i) said (A) additive organopolysiloxane composition is present in an amount of from 5 weight % to 90 weight %; and
(ii) said (D) organopolysiloxane having at least two silicon-bonded aliphatically unsaturated groups per molecule is present in an amount of from 10 weight % to 90 weight %, each based on total weight of said curable composition.

13. The curable composition of claim 9, wherein a ratio of silicon-bonded hydrogen atoms to silicon-bonded aliphatically unsaturated groups is from 0.5:1 to 4:1.

14. A method of preparing the curable composition of claim 9, said method comprising combining the (A) additive organopolysiloxane, the (B) organosilicon compound having at least two silicon-bonded hydrogen atoms per molecule, and the (C) hydrosilylation catalyst to give the curable composition.

15. The method of claim 9, wherein in (A) the additive organopolysiloxane composition in the unit formula for said (A3) polydiorganosiloxane:
(i) h=4, and said (A3) polydiorganosiloxane is cyclic and has unit formula $(R^1R^2SiO_{2/2})_4$, wherein each $R^1$ independently is a substituted or unsubstituted hydrocarbyl group; each $R^2$ independently is an aliphatically unsaturated group; or
(ii) f=2, and said (A3) polydiorganosiloxane is a linear aliphatically unsaturated polydiorganosiloxane oligomer of formula $R^1{}_2R^2Si-O-(R^1{}_2Si-O)_i-SiR^1{}_2R^2$, where each $R^1$ independently is a substituted or unsubstituted hydrocarbyl group; each $R^2$ independently is an aliphatically unsaturated group; and subscript i is 0 or 1; or
(iii) g=2, and said (A3) polydiorganosiloxane is a linear polydiorganosiloxane oligomer of formula $R^1{}_3Si-O-(R^1{}_2Si-O)_i-SiR^1{}_3$, where each $R^1$ independently is a substituted or unsubstituted hydrocarbyl group; and subscript i is 0 or 1.

16. The method of claim 9, wherein in the additive organopolysiloxane composition:
(i) said (A) additive organopolysiloxane composition consists essentially of said (A1) branched organopolysiloxane polymer, said (A2) silicone resin, and (A3) said polydiorganosiloxane;
(ii) said (A) additive organopolysiloxane composition comprises said (A1) branched organopolysiloxane polymer in an amount of from 20 weight % to 60 weight %, said (A2) silicone resin in an amount of from 30 weight % to 70 weight %, and (A3) polydiorganosiloxane in an amount of from 5 weight % to 15 weight %, based on combined weights of components (A1), (A2), and (A3) in said (A) additive organopolysiloxane composition; or
(iii) both (i) and (ii).

17. The curable composition of claim 9, where the weight ratio of resin/polymer (A2)/(A1) is 0.8/1 to 1.6/1.

18. A method of forming a film, said method comprising:
applying a curable composition on a substrate to give a deposit; and
forming a film on the substrate from the deposit;
wherein the curable composition comprises:
(A) an additive organopolysiloxane composition, said (A) additive organopolysiloxane composition comprising:
(A1) a branched organopolysiloxane polymer having unit formula

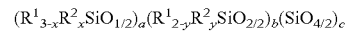

wherein each $R^1$ independently is a substituted or unsubstituted hydrocarbyl group; each $R^2$ independently is an aliphatically unsaturated group; subscript x represents number of aliphatically unsaturated groups in the unit of formula $(R^1{}_{3-x}R^2{}_xSiO_{1/2})$, x has a value from 0 to 3, subscript y represents number of aliphatically unsaturated groups in the unit of formula $(R^1{}_{2-y}R^2{}_ySiO_{2/2})$, y has a value from 0 to 2, with the proviso that subscript x and subscript y are not simultaneously 0; with the proviso that the branched organopolysiloxane polymer has at least 3 groups $R^2$ per molecule; subscripts a, b, and c represent mole fractions of each unit in the unit formula, and subscripts a, b, and c have values such that 0<a≤0.3, 0.4≤b≤0.97, and 0<c≤0.3, with the proviso that a+b+c=1; and
(A2) a silicone resin comprising unit formula

wherein each $R^1$ independently is a substituted or unsubstituted hydrocarbyl group; each $R^2$ independently is an aliphatically unsaturated group; and subscript z represents number of aliphatically unsaturated groups in the unit of formula $(R^1{}_{3-z}R^2{}_zSiO_{1/2})$, subscript z has a value from 0 to 3, subscripts d and e represent mole fractions of each unit in the unit formula, subscripts d and e have values such that 0.2≤d≤0.7, 0.3≤e≤0.8, with the proviso that d+e=1; with the proviso that said (A2) silicone resin includes a content of $R^2$ of from 1.5 to 7.0 weight percent (wt. %) based on the total weight of said (A2) silicone resin; and
where starting materials (A1) and (A2) are present in amounts sufficient to provide a weight ratio of resin/polymer (A2)/(A1) of 0.8/1 to 2.0/1;
(A3) >0 to 50 weight % of a polydiorganosiloxane having unit formula

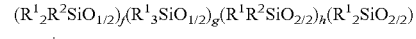

wherein each $R^1$ independently is a substituted or unsubstituted hydrocarbyl group; each $R^2$ independently is an aliphatically unsaturated group; and subscripts f, g, h, and i represent numbers of each unit in the unit formula and have values such that f≥0, g≥0, h≥0, i≥0, and 2≥f+g+h+i≥4;
(B) an organosilicon compound having at least two silicon-bonded hydrogen atoms per molecule; and
(C) a hydrosilylation catalyst.

19. A film formed via the method of claim 18.

20. The method of claim 18, where the weight ratio of resin/polymer (A2)/(A1) is 0.8/1 to 1.6/1.

\* \* \* \* \*